US011719869B2

(12) United States Patent
Lee et al.

(10) Patent No.: US 11,719,869 B2
(45) Date of Patent: Aug. 8, 2023

(54) POLARIZING PLATE, POLARIZING PLATE-CARRIER FILM LAMINATE, METHOD FOR PREPARING POLARIZING PLATE-CARRIER FILM LAMINATE, METHOD FOR PREPARING POLARIZING PLATE, AND ACTIVE ENERGY RAY CURABLE COMPOSITION

(71) Applicant: SHANJIN OPTOELECTRONICS (SUZHOU) CO., LTD., Zhangjiang (CN)

(72) Inventors: Mi So Lee, Daejeon (KR); Yoonkyung Kwon, Daejeon (KR); Jin Woo Kim, Daejeon (KR); Dong Uk Kim, Daejeon (KR)

(73) Assignee: SHANJIN OPTOELECTRONICS (SUZHOU) CO., LTD., Zhangjiagang (CN)

( * ) Notice: Subject to any disclaimer, the term of this patent is extended or adjusted under 35 U.S.C. 154(b) by 293 days.

(21) Appl. No.: 16/770,813

(22) PCT Filed: Dec. 14, 2018

(86) PCT No.: PCT/KR2018/015941
§ 371 (c)(1),
(2) Date: Jun. 8, 2020

(87) PCT Pub. No.: WO2019/117676
PCT Pub. Date: Jun. 20, 2019

(65) Prior Publication Data
US 2020/0393603 A1 Dec. 17, 2020

(30) Foreign Application Priority Data

Dec. 15, 2017 (KR) .................. 10-2017-0173268

(51) Int. Cl.
*B32B 27/30* (2006.01)
*B32B 27/38* (2006.01)
(Continued)

(52) U.S. Cl.
CPC .............. *G02B 5/305* (2013.01); *B32B 7/023* (2019.01); *B32B 7/12* (2013.01); *B32B 27/18* (2013.01);
(Continued)

(58) Field of Classification Search
CPC ................ B05D 3/067; B05D 2504/00; B29C 65/4845; B29C 66/83413;
(Continued)

(56) References Cited

U.S. PATENT DOCUMENTS 7,171,087 B2 * 1/2007 Takahashi ............ G02B 6/4432
385/103
2014/0106149 A1 4/2014 Seo et al.
(Continued)

FOREIGN PATENT DOCUMENTS

CN 101644792 A 2/2010
CN 106062057 A 10/2016
(Continued)

OTHER PUBLICATIONS

Extended European Search Report including Written Opinion for EP18889760.7 dated Nov. 19, 2020; 8 pages.
(Continued)

*Primary Examiner* — Michael A Tolin
(74) *Attorney, Agent, or Firm* — Schmeiser, Olsen & Watts, LLP

(57) ABSTRACT

A polarizing plate and a polarizing plate-carrier film laminate are provided. A method for manufacturing a polarizing plate-carrier film laminate and a method for manufacturing a polarizing plate using the same polarizing plate-carrier
(Continued)

film laminate are also provided. An active energy ray curable composition for a polarizing plate protective layer is also provided.

16 Claims, 2 Drawing Sheets

(51) Int. Cl.
| | |
|---|---|
| *B32B 37/10* | (2006.01) |
| *B32B 37/12* | (2006.01) |
| *B32B 37/24* | (2006.01) |
| *B32B 38/10* | (2006.01) |
| *B32B 7/023* | (2019.01) |
| *B32B 7/12* | (2006.01) |
| *G02B 1/18* | (2015.01) |
| *G02B 5/30* | (2006.01) |
| *G02F 1/1335* | (2006.01) |
| *B32B 27/18* | (2006.01) |

(52) U.S. Cl.
CPC ........... *B32B 27/306* (2013.01); *B32B 27/38* (2013.01); *B32B 37/10* (2013.01); *B32B 37/1284* (2013.01); *B32B 38/10* (2013.01); *G02B 1/18* (2015.01); *G02F 1/133528* (2013.01); *B32B 2037/243* (2013.01); *B32B 2305/72* (2013.01); *B32B 2307/42* (2013.01)

(58) Field of Classification Search
CPC .......... B29D 11/00644; B29D 11/0073; B29D 11/00788; B32B 7/023; B32B 7/12; B32B 27/08; B32B 27/18; B32B 27/26; B32B 27/306; B32B 27/36; B32B 27/38; B32B 37/10; B32B 37/12; B32B 37/1284; B32B 37/24; B32B 37/26; B32B 2037/1253; B32B 2037/243; B32B 2037/264; B32B 2037/266; B32B 2037/268; B32B 38/10; B32B 2038/0076; B32B 2255/10; B32B 2255/24; B32B 2255/26; B32B 2305/72; B32B 2307/30; B32B 2307/40; B32B 2307/42; B32B 2307/732; B32B 2307/748; B32B 2310/0831; B32B 2457/20; B32B 2457/202; B32B 2457/206; B32B 2251/00; C09D 163/00; C09D 163/04; C09J 163/00; C09J 163/04; C09K 2323/03; C09K 2323/031; G02B 1/04; G02B 1/08; G02B 1/12; G02B 1/14; G02B 1/18; G02B 5/30; G02B 5/3025; G02B 5/3033; G02B 5/3041; G02B 5/305; G02F 1/133528; Y10T 156/11; Y10T 156/1168; Y10T 156/1174; Y10T 156/1195; Y10T 156/19; Y10T 156/195; Y10T 156/1994
See application file for complete search history.

(56) References Cited

U.S. PATENT DOCUMENTS

| | | |
|---|---|---|
| 2015/0277008 A1 | 10/2015 | Huh et al. |
| 2015/0361271 A1* | 12/2015 | Kato ................... C09D 163/00 523/400 |
| 2016/0091637 A1 | 3/2016 | Yasushita |
| 2016/0229170 A1* | 8/2016 | Cho ....................... B32B 37/10 |
| 2016/0238767 A1 | 8/2016 | Park et al. |
| 2016/0376435 A1 | 12/2016 | Hagenbucher et al. |

FOREIGN PATENT DOCUMENTS

| | | | |
|---|---|---|---|
| EP | 2468835 A1 * | 6/2012 | ............ C09J 163/00 |
| EP | 3054328 A1 | 8/2016 | |
| JP | 2007047498 A | 2/2007 | |
| JP | 101644792 A | 2/2010 | |
| JP | 106062057 A | 10/2016 | |
| JP | 2017072728 A | 4/2017 | |
| KR | 20090101110 A | 9/2009 | |
| KR | 100938342 B1 | 1/2010 | |
| KR | 100938342 B1 * | 1/2010 | |
| KR | 20100138811 A | 12/2010 | |
| KR | 20150037555 A | 4/2015 | |
| KR | 20160001501 A | 1/2016 | |
| KR | 20160037117 A | 4/2016 | |
| KR | 20160037811 A | 4/2016 | |
| KR | 20160037811 A * | 4/2016 | |
| KR | 20170041634 A | 4/2017 | |
| TW | 200948920 A | 12/2009 | |
| WO | 2015182351 A1 | 12/2015 | |

OTHER PUBLICATIONS

International Search Report from Application No. PCT/KR2018/015941 dated May 23, 2019, 3 pages.

* cited by examiner

POLARIZING PLATE, POLARIZING PLATE-CARRIER FILM LAMINATE, METHOD FOR PREPARING POLARIZING PLATE-CARRIER FILM LAMINATE, METHOD FOR PREPARING POLARIZING PLATE, AND ACTIVE ENERGY RAY CURABLE COMPOSITION

CROSS-REFERENCE TO RELATED APPLICATIONS

The present application is a national stage entry under 35 U.S.C. § 371 of International Application No. PCT/KR2018/015941 filed on Dec. 14, 2018, which claims priority to Korean Patent Application No. 10-2017-0173268 filed in the Korean Intellectual Property Office on Dec. 15, 2017, the entire contents of which are incorporated herein by reference in their entirety.

TECHNICAL FIELD

The present specification intends to provide a polarizing plate, a polarizing plate-carrier film laminate, a method for manufacturing a polarizing plate-carrier film laminate, a method for manufacturing a polarizing plate, and an active energy ray curable composition.

BACKGROUND ART

An existing polarizing plate for a liquid crystal display device has a configuration in which a general polyvinyl alcohol-based polarizer is used, and a protective film such as PET is attached to at least one surface of the polarizer.

Recently, as the requirements according to low light leakage and thinning have been increased in the polarizing plate market, a method for directly forming a protective film on a polarizer has been studied instead of applying an existing protective base material which is film-formed in advance in order to satisfy these physical properties.

However, when a protective film is directly formed on an existing polyvinyl alcohol-based stretching type polyvinyl alcohol-based polarizer, it was difficult to solve a problem in that a tearing phenomenon of the polarizer occurs due to stress generated by the shrinkage of the polarizer at high temperature as compared to the case of conventionally applying a protective base material on both surfaces.

DETAILED DESCRIPTION OF INVENTION

Technical Problem

The present specification intends to provide a polarizing plate, a polarizing plate-carrier film laminate, a method for manufacturing a polarizing plate-carrier film laminate, a method for manufacturing a polarizing plate, and an active energy ray curable composition.

Technical Solution

An exemplary embodiment of the present specification provides a polarizing plate comprising: a polarizer; a bonding agent layer and a protective film sequentially provided on one surface of the polarizer; and a protective layer which is directly attached to the other surface of the polarizer, in which the protective layer is a resin layer comprising an active energy ray curable composition comprising an epoxy compound which does not contain an aromatic ring and 15 to 40 parts by weight of a bisphenol F-type epoxy compound, 30 to 80 parts by weight of an oxetane compound, and 1 to 20 parts by weight of a polyol compound based on 100 parts by weight of the epoxy compound which does not contain an aromatic ring, or a cured product thereof.

Further, an exemplary embodiment of the present specification provides a polarizing plate-carrier film laminate comprising a carrier film on the other surface of a surface of a protective layer brought into contact with a polarizer.

In addition, an exemplary embodiment of the present specification provides a method for manufacturing the above-described polarizing plate-carrier film laminate, the method comprising: supplying a carrier film to one surface of a polarizer; supplying a protective film to the other surface of the polarizer; forming a protective layer by supplying an active energy ray curable composition between the polarizer and the carrier film; forming a bonding agent layer by supplying a photocurable bonding agent composition between the polarizer and the protective film; pressurizing a laminate in which the carrier film, the protective layer, the polarizer, the bonding agent and the protective film are sequentially laminated by disposing a pair of pressurization means on each of the carrier film and the protective film; and curing the protective layer and the bonding agent layer by irradiating the protective layer and the bonding agent layer with an active energy ray.

Furthermore, an exemplary embodiment of the present specification provides a method for manufacturing a polarizing plate, the method comprising: manufacturing a polarizing plate-carrier film laminate by the method for manufacturing a polarizing plate-carrier film laminate; and peeling off a carrier film from the protective layer of the polarizing plate-carrier film laminate.

Further, an exemplary embodiment of the present specification provides an active energy ray curable composition for a polarizing plate protective layer, comprising an epoxy compound which does not contain an aromatic ring and 15 to 40 parts by weight of a bisphenol F-type epoxy compound, 30 to 80 parts by weight of an oxetane compound, and 1 to 20 parts by weight of a polyol compound based on 100 parts by weight of the epoxy compound which does not contain an aromatic ring.

Advantageous Effects

A polarizing plate according to an exemplary embodiment of the present specification has an effect in that the bonding strength of a protective layer with respect to a polarizer is improved.

A polarizing plate-carrier film laminate according to an exemplary embodiment of the present specification has an effect in that peeling properties of a carrier film and a protective layer are improved.

A method for manufacturing a polarizing plate according to an exemplary embodiment of the present specification has an effect in that a blocking phenomenon is suppressed in a process of peeling off a carrier film from the protective layer.

A polarizing plate manufactured by the method for manufacturing a polarizing plate using the polarizing plate-carrier film laminate according to an exemplary embodiment of the present specification has an effect in that optical properties are improved.

A method for manufacturing a polarizing plate using the polarizing plate-carrier film laminate according to an exemplary embodiment of the present specification has an effect in that processability is improved by using a roll-to-roll process in order to peel off a carrier film.

EXPLANATION OF REFERENCE NUMERALS AND SYMBOLS

Figure 1:
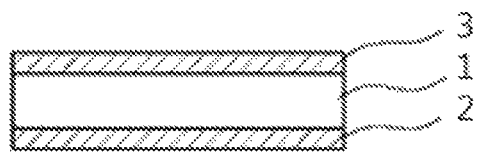
FIG. 1 is a cross-sectional view of a polarizing plate according to an exemplary embodiment of the present specification.

1: Polarizer
2: Protective layer
3: Protective film
4: Adhesive layer
5: Carrier film
6: Polarizing plate
7: Image display panel
10, 20: Pressurization roll
30, 40: Traveling roll
50: Bonding agent composition application means
60: Active energy ray irradiation means
70: Application means of a composition for forming a protective layer
100: Polarizer
110: Polarizer roll
200: Carrier film
210: Carrier film roll
300: Protective film
310: Protective film roll
500: Polarizing plate winding roll

BEST MODE

Hereinafter, the present invention will be described.

In the present specification, the fact that two or more elements are sequentially provided, for example, the term "A and B" sequentially provided also comprises a case where the elements A and B are disposed in the order and another element is interposed between A and B, for example, a case where A, C, and B are disposed in this order.

Further, in the present specification, the fact that two elements are attached to each other or directly attached, for example, the term "B is directly attached to A" may mean a case where another element is not interposed on at least one main surface of A, and B is directly attached to the surface.

In the present specification, the term "curing of a composition" means a process in which the composition changes so as to be capable of exhibiting bonding or adhesion characteristics due to physical actions or chemical reactions, and the like of components of the composition. Further, in the present specification, the term "active energy ray" may mean not only microwaves, infrared ray (IR), ultraviolet (UV) ray, X-ray, and γ-ray, but also a particle beam such as an α particle beam, proton beam, neutron beam, and electron beam, and may be typically ultraviolet (UV) ray or electron beam. In addition, the term "active energy ray curable" as described above may mean that the curing as described above may be induced by irradiation of an active energy ray. In one example of the present invention, curing of the active energy ray curable composition may be performed through free radical polymerization or cation reaction by irradiation of an active energy ray, and may be preferably performed as the free radical polymerization and the cation reaction simultaneously or sequentially proceed.

In the present specification, the term "epoxy compound" may mean a monomeric, oligomeric or polymeric compound comprising one or more, preferably two or more epoxy groups.

The present specification provides a polarizing plate comprising: a polarizer; a bonding agent layer and a protective film sequentially provided on one surface of the polarizer; and a protective layer which is directly attached to the other surface of the polarizer, in which the protective layer is a resin layer comprising an active energy ray curable composition comprising an epoxy compound which does not contain an aromatic ring, 15 to 40 parts by weight of a bisphenol F-type epoxy compound based on 100 parts by weight of the epoxy compound which does not contain an aromatic ring, and 30 to 80 parts by weight of an oxetane compound based on 100 parts by weight of the epoxy compound which does not contain an aromatic ring, or a cured product thereof.

Since a polarizer is typically manufactured of a hydrophilic resin such as polyvinyl alcohol, the polarizer is generally vulnerable to moisture. In addition, since a stretching process is generally performed in the manufacture of the polarizer, contraction easily occurs under a humid condition, and thus there is a problem in that optical characteristics of the polarizing plate, and the like are degraded. Accordingly, to typically reinforce physical properties of a polarizer, a protective film represented by a polyethylene terephthalate (PET) film is generally attached to both surfaces of the polarizer, and when there is no protective film, there are problems in that due to poor dimensional stability of the polarizer, durability and optical properties greatly deteriorate, and water resistance is dramatically decreased.

To this end, in one exemplary structure of the polarizing plate of the present invention, since a protective film is not attached to at least one surface of the polarizer, a thinner and lighter structure is implemented and simultaneously, a structure in which a protective layer is directly attached to the surface of the polarizer to which the protective film is not attached is employed.

In the specification, a polarizing plate in which attachment of the protective film is omitted on at least one surface of the polarizer as described above may also be referred to as a thin polarizing plate (thin polarizer).

In the present specification, a polarizing plate in which a protective layer is provided on one surface of a polarizer and a protective film is provided on the other surface of the polarizer may be referred to as a 'one-sided thin polarizing plate'.

In the method for manufacturing a polarizing plate, the roll-to-roll process may be performed as a continuous process, so that there is an advantage in that production yield is high and the process is very economical.

Further, in order to form a protective layer during a process of manufacturing a polarizing plate, when a composition for forming a protective layer is applied onto a polarizer, a bonding strength with another configuration is imparted to the composition for forming a protective layer, and a carrier film is provided on the composition for forming a protective layer in order to prevent the composition from being washed away. Thereafter, after the composition for forming a protective layer is cured, the carrier film is peeled off, but due to the bonding property of the composition for forming a protective layer, there are problems in that a phenomenon in which apart of the carrier film falls off from the protective layer at the time of peeling off the carrier film, that is, a blocking phenomenon occurs, and optical characteristics of a polarizing plate are inhibited.

In particular, the polarizing plate-carrier film laminate is stored for a long period of time, if necessary in some cases, and the above-described blocking phenomenon may more severely occur while the time when the protective layer and the carrier film are attached to each other is prolonged.

Thus, the present invention intends to suppress the above-described blocking phenomenon which may occur during the process of manufacturing a polarizing plate by comprising 15 to 40 parts by weight of a bisphenol F-type epoxy compound based on 100 parts by weight of an epoxy compound which does not contain an aromatic ring in an active energy ray curable composition for forming a protective layer to have an effect of increasing adhesion between the protective layer and a polarizer and simultaneously decreasing adhesion between the protective layer and the carrier film, that is, a conflicting effect.

Figure 2:
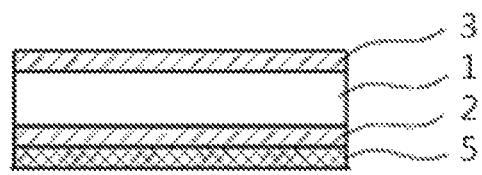
FIG. 2 is a cross-sectional view of a polarizing plate-carrier film laminate according to an exemplary embodiment of the present specification.

In the present specification, the polarizing plate-carrier film laminate is used for manufacturing a polarizing plate, and may be used as a polarizing plate after being subjected to a process of peeling off a carrier film. The polarizing plate-carrier film laminate comprises: a polarizer 1; a bonding agent layer and a protective film 3 sequentially provided on one surface of the polarizer; and a protective layer 2 and a carrier film 5 sequentially provided on the other surface of the polarizer. The structure is as illustrated in FIG. 2.

When the polarizing plate-carrier film laminate is used for manufacturing a polarizing plate, the polarizing plate-carrier film laminate has an effect in that a blocking phenomenon of the carrier film and the protective layer is suppressed because a bonding strength between the protective layer and the carrier film is low even when the carrier film is peeled off. That is, the above-described blocking phenomenon may be suppressed by adjusting the peel strength of the protective layer of the polarizing plate-carrier film laminate with respect to the polarizer at a high level, and adjusting the peel strength of the protective layer with respect to the carrier film at a low level.

The blocking phenomenon may be solved as the bonding strength ($X1$) of the protective layer with respect to the polarizer is maintained at a high level and the peel strength ($X3$) of the protective layer with respect to the carrier film is adjusted to a low value.

According to an exemplary embodiment of the present specification, the bonding strength ($X1$) of the protective layer with respect to the polarizer may be 4B or more, 4B to 5B, preferably 5B when measured by the ASTM standard cross-cut tape test in accordance with the measurement criterion D3359-87. The bonding strength of the protective layer with respect to the polarizer may be a value measured after the polarizing plate-carrier film laminate is left to stand at room temperature (25° C.) and a relative humidity of 30% to 45% for 1 hour to 100 hours, and may be preferably a value measured at a relative humidity of 43%.

When the bonding strength ($X1$) of the protective layer with respect to the polarizer is the same as the numerical value, the bonding strength of the protective layer with respect to the polarizer is excellent, so that it is possible to suppress a phenomenon in which the protective layer is lifted from the polarizer when the carrier film is peeled off from the protective layer. In addition, when the bonding strength is less than 4B, the polarizer may be discolored or polarizing characteristics may deteriorate.

The bonding strength ($X1$) of the protective layer with respect to the polarizer may be measured by a cross-cut tape test.

As the cross-cut test method, a cutting guide, an appropriate ruler, or the like is placed on a protective layer from which a carrier film is peeled off, and grid shapes are drawn horizontally and vertically in the form of go board grids with an interval of 1 mm on the sample, by using a cross cutter. Thereafter, the surface of the protective layer is cleaned by a brush or a dust-free cloth, and then Nichiban tape (cellophane tape manufactured by Nichiban Co., Ltd.) is attached to the surface, and with respect to the peeled surface after the protective layer is sharply peeled off at a peel angle of 180 degrees, it is observed by the unaided eye how much the protective layer falls off. According to the cross-cut classification standard (ASTM) of the following Table 1, the degree of bonding is divided into 0B to 5B.

TABLE 1

| ASTM | Remaining area % |
| --- | --- |
| 5B | 100 |
| 4B | 95 or more and less than 100 |
| 3B | 85 or more and less than 95 |
| 2B | 65 or more and less than 85 |
| 1B | 45 or more and less than 65 |
| 0B | 45 or less |

According to an exemplary embodiment of the present specification, $X2$ calculated according to the following General Equation 1 may be 0.95 to 1, preferably 0.96 to 1, and more preferably 0.99 to 1.

$$X2 = \text{(Area of the remaining protective layer after the ASTM standard cross-cut tape test)}/\text{(Area of the entire peeled surface)} \quad \text{[General Equation 1]}$$

In General Equation 1, the ASTM standard cross-cut tape test may be performed by an ASTM standard cross-cut tape test in accordance with the D3359-87.

In General Equation 1, the area of the entire peeled surface may mean an entire surface on which a tape attached to the protective layer for the ASTM standard cross-cut tape test is brought into contact with the protective layer.

In an exemplary embodiment of the present specification, the peel strength ($X3$) of the protective layer with respect to the carrier film may be 40 gf/5 cm or less, preferably 30 gf/5 cm or less, and more preferably 10 gf/5 cm or less. When the numerical range is satisfied, it is possible to effectively suppress a blocking phenomenon of the protective layer and the carrier film from occurring at the time of peeling off the carrier film.

The peel strength ($X3$) of the protective layer with respect to the carrier film may be measured at 180° and a rate of 30 m/min in accordance with the ASTM D3330. For example, the peel strength ($X3$) may be measured by using a film high-speed peeling machine (CBT-4720, Chungbuk Tech).

Furthermore, the peel strength ($X3$) of the protective layer with respect to the carrier film may be a value measured after the polarizing plate-carrier film laminate is left to stand at room temperature (25° C.) and a relative humidity of 30% to 45% for 1 hour to 100 hours, and may be preferably a value measured at a relative humidity of 43%.

In an exemplary embodiment of the present specification, a value ($X3/X2$) of $X3$ divided by $X2$ may be 45 gf/5 cm or less, 30 gf/5 cm or less, or 10 gf/5 cm or less. In this case, the bonding strength of the protective layer with respect to the polarizer is high, whereas the bonding strength of the protective layer with respect to the carrier film is low, so that it is possible to prevent the protective layer from being lifted at the interface with the polarizer and to easily peel off the carrier film during the process of peeling off the carrier film in a process of manufacturing a polarizing plate. That is, peeling defects may be alleviated.

Bisphenol F-Type Epoxy Compound

The polarizing plate according to an exemplary embodiment of the present specification may comprise a protective layer which is a resin layer comprising an active energy ray curable composition or a cured product thereof, and the active energy ray curable composition may comprise a bisphenol F-type epoxy compound. In this way, it is possible to satisfy the relationship between a peel strength (X1) of the protective layer with respect to the polarizer and a peel strength (X3) of the protective layer with respect to the carrier film, that is, a numerical range of the peel strength (X1) of the protective layer with respect to the polarizer and the peel strength (X3) of the protective layer with respect to the carrier film.

Further, the bisphenol F-type epoxy compound may impart hydrophobicity to the protective layer by containing an aromatic ring in the molecule thereof. Specifically, the bisphenol F-type epoxy compound serves to improve durability of the polarizing plate by serving as a moisture barrier in a rigorous reliability evaluation such as wet heat resistance (left to stand at a temperature of 80° C. and a humidity of 90% or more for 500 hours or more) or water resistance (immersion at 60° C. for 24 hours).

According to an exemplary embodiment of the present specification, the active energy ray curable composition may comprise an epoxy compound which does not contain an aromatic ring, 15 to 40 parts by weight of a bisphenol F-type epoxy compound based on 100 parts by weight of the epoxy compound which does not contain an aromatic ring, and 30 to 80 parts by weight of an oxetane compound based on 100 parts by weight of the epoxy compound which does not contain an aromatic ring. When the numerical range is satisfied, at the time of forming a protective layer by using the active energy ray curable composition, the peel strength of the protective layer with respect to the carrier film may be adjusted to a predetermined level or less while maintaining an excellent peel strength of the protective layer with respect to the polarizer. For this reason, it is possible to effectively suppress the blocking phenomenon from occurring during the process of peeling off the carrier film. In particular, the above-described effect may be maximized by adjusting the weight of the bisphenol F-type epoxy compound.

According to an exemplary embodiment of the present specification, the bisphenol F-type epoxy compound may be included in an amount of 1 to 40 parts by weight, 10 to 40 parts by weight, 15 to 40 parts by weight, or 17 to 35 parts by weight based on 100 parts by weight of the epoxy compound which does not contain an aromatic ring. In addition, when the numerical range is satisfied, there are advantages in that it is possible to suppress durability of the protective layer after curing from deteriorating, it is possible to effectively suppress contamination from occurring, and it is possible to improve coatability by suppressing viscosity of the active energy ray curable composition from being excessively increased.

Type of Bisphenol F-Type Epoxy Compound

In an exemplary embodiment of the present specification, the bisphenol F-type epoxy compound is differentiated from a bisphenol A-type epoxy compound, and is an epoxy resin having hydrogen (H) instead of a methyl group ($—CH_3$) located at the center of a molecule of a bisphenol A-type epoxy compound. The bisphenol F-type epoxy compound has advantages in that the bisphenol F-type epoxy compound is easily coated due to the low viscosity, and has excellent compatibility with other resins in the composition as compared to the bisphenol A-type epoxy compound.

In particular, since most of the bisphenol A-type epoxy compounds are in a solid state at room temperature, there is a problem with precipitation and storage stability due to crystallization, but when the bisphenol F-type epoxy compound is used, the above-described problems may be suppressed.

The bisphenol F-type epoxy compound is not particularly limited as long as the bisphenol F-type epoxy compound comprises bisphenol F, examples thereof comprise diglycidyl ether of bisphenol F (DGEBF), and the compound may be represented by the following Formula A.

[Formula A]

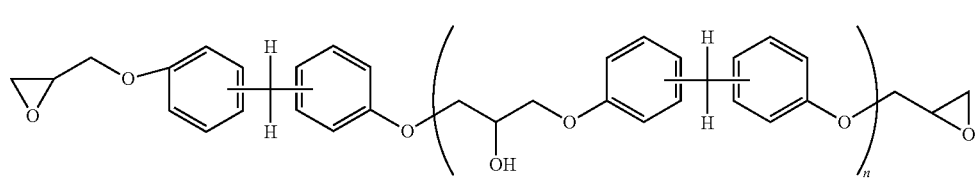

In Formula A, n is an integer of 0 to 5.

In an exemplary embodiment of the present specification, Chemical Formula A may be represented by the following Formula A-1.

[Formula A-1]

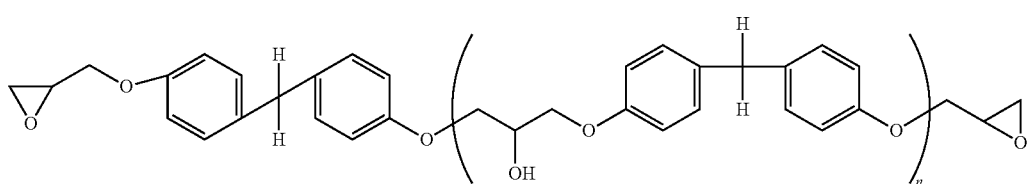

According to an exemplary embodiment of the present specification, an epoxy equivalent weight of the bisphenol F-type epoxy compound may be 120 g/eq or more, for example, 120 g/eq to 500 g/eq, 120 g/eq to 300 g/eq, or 170 g/eq to 250 g/eq. When the numerical range is satisfied, participation of the bisphenol F-type epoxy compound in a crosslinking reaction is increased because a relatively larger amount of epoxies are substituted in the same molecular weight, so that in the process of forming a protective layer, the reaction rate may be improved, and the viscosity of a composition comprising the bisphenol F-type epoxy compound may be maintained within a predetermined range.

In the present specification, the epoxy equivalent weight is a value measured in accordance with JIS K-7236, and means a g number of a resin comprising 1 g equivalent weight of an epoxy compound.

According to an exemplary embodiment of the present specification, the bisphenol F-type epoxy compound may have a viscosity at 25° C. of 2,000 cps to 5,000 cps, preferably 2,000 cps to 3,500 cps. When the numerical range is satisfied, a final viscosity of a photocurable composition can be adjusted within 200 cps, and during the formation of a protective layer, the protective layer can be formed in a uniform thickness.

The viscosity of the bisphenol F-type epoxy compound is measured at room temperature (25° C.) by using a No. 25 spindle using a Brookfield viscometer (manufactured by Brookfield Industries, Inc.). In this case, the amount of composition is appropriately 16 to 20 mL, and the numerical value is measured after the entire sample to be measured reaches a desired suitable temperature, and thus achieves a temperature equilibrium.

Epoxy Compound which does not Contain Aromatic Ring

The polarizing plate or polarizing plate-carrier film laminate according to an exemplary embodiment of the present specification comprises a protective layer which is a resin layer comprising an active energy ray curable composition or a cured product thereof, and the active energy ray curable composition comprises an epoxy compound which does not contain an aromatic ring.

In an exemplary embodiment of the present specification, it is preferred that an epoxy resin which does not contain an aromatic ring is used as a main component from the viewpoint of weather resistance, refractive index, cationic polymerization, and the like.

In the present specification, "to use A as a main component" means that "the content of A is larger than the content of each of the other components in the composition".

In an exemplary embodiment of the present specification, examples of the epoxy resin which does not contain an aromatic ring comprise a hydrogenated epoxy resin, an alicyclic-type epoxy resin, an aliphatic epoxy resin, and the like.

In an exemplary embodiment of the present specification, the epoxy resin which does not contain an aromatic ring may be an alicyclic-type epoxy compound. In this case, the glass transition temperature of an active energy ray curable composition which forms a protective layer is increased, thereby allowing the protective layer to secure sufficient durability, so that even though the protective layer is directly formed on any one surface of a polarizer without interposing a protective film, it is possible to prevent cracks of the polarizer from occurring even under heat resistance or heat impact conditions.

The hydrogenated epoxy resin may be obtained by a selective hydrogenation reaction of the aromatic ring in the aromatic epoxy resin under pressure in the presence of a catalyst. Examples of the aromatic epoxy resin comprise: a bisphenol-type epoxy resin such as diglycidyl ether of bisphenol A, diglycidyl ether of bisphenol F, and diglycidyl ether of bisphenol S; a novolac-type epoxy resin such as a phenol novolac epoxy resin, a cresol novolac epoxy resin, and a hydroxybenzaldehyde phenol novolac resin; a multi-functional-type epoxy resin such as glycidyl ether of tetrahydroxyphenylmethane, glycidyl ether of tetrahydroxybenzophenone, and epoxidized polyvinyl phenol, and the like. It is preferred that glycidyl ether of hydrogenated bisphenol A is used.

The alicyclic-type epoxy resin is a compound having at least one epoxy group bonded to the alicyclic-type ring in the molecule thereof as being represented by the following Formula B.

[Formula B]

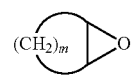

In Formula B, m is an integer of 2 to 5, and a compound in which a group obtained by removing one or plural hydrogen atoms in $(CH_2)$ m in Formula B is bonded to another chemical structure having no aromatic ring may be an alicyclic-type epoxy compound.

As the alicyclic-type epoxy compound, for example, a compound to be specifically exemplified below may be used, but an available epoxy compound is not limited to the following types. As the alicyclic-type epoxy compound, an epoxycyclohexylmethyl epoxycyclohexanecarboxylate-based compound represented by the following [Formula 1] may be exemplified.

[Formula 1]

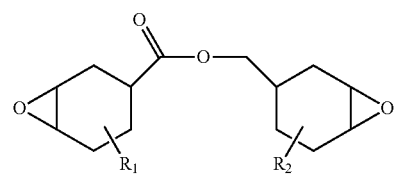

In Formula 1, $R_1$ and $R_2$ each independently represent hydrogen or an alkyl group.

In the present specification, the term alkyl group may mean a straight-chained, branched, or cyclic alkyl group having 1 to 20, 1 to 16, 1 to 12, 1 to 8, or 1 to 4 carbon atoms, unless otherwise specifically defined, and the alkyl group may be in a state of being arbitrarily unsubstituted or substituted with one or more substituents.

Other examples of the alicyclic-type epoxy compound comprise an epoxycyclohexane carboxylate-based compound of an alkanediol, which is represented by the following Formula 2.

[Formula 2]

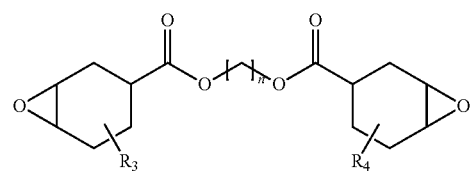

In Formula 2, $R_3$ and $R_4$ each independently represent hydrogen or an alkyl group, and n represents an integer of 2 to 20.

Further, still other examples of the alicyclic-type epoxy compound comprise an epoxycyclohexylmethyl ester-based compound of a dicarboxylic acid, which is represented by the following Formula 3.

[Formula 3]

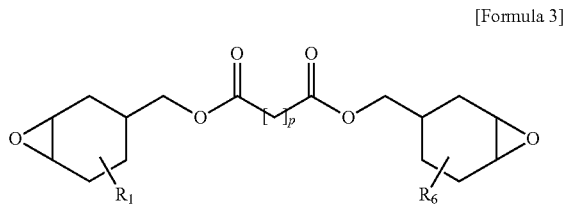

In Formula 3, $R_5$ and $R_6$ each independently represent hydrogen or an alkyl group, and p represents an integer of 2 to 20. Yet other examples of the alicyclic-type epoxy compound comprise an epoxycyclohexylmethyl ether-based compound of polyethylene glycol, which is represented by the following Formula 4.

[Formula 4]

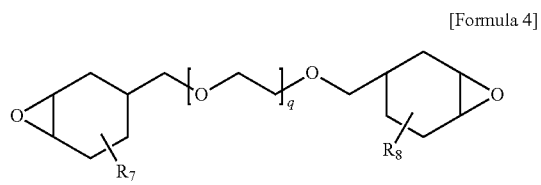

In Formula 4, $R_7$ and $R_8$ each independently represent hydrogen or an alkyl group, and q represents an integer of 2 to 20. Still yet other examples of the alicyclic-type epoxy compound comprise an epoxycyclohexylmethyl ether-based compound of an alkanediol, which is represented by the following Formula 5.

[Formula 5]

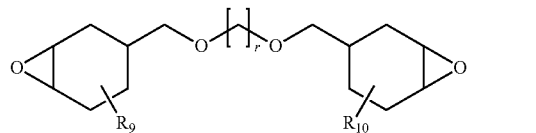

In Formula 5, $R_9$ and $R_{10}$ each independently represent hydrogen or an alkyl group, and r represents an integer of 2 to 20.

Further examples of the alicyclic-type epoxy compound comprise a diepoxytrispiro-based compound represented by the following Formula 6.

[Formula 6]

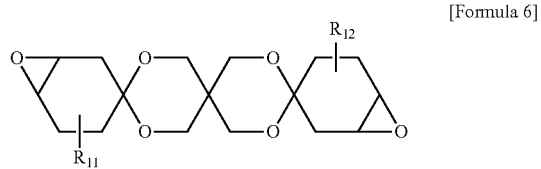

In Formula 6, $R_{11}$ and $R_{12}$ each independently represent hydrogen or an alkyl group.

Other further examples of the alicyclic-type epoxy compound comprise a diepoxymonospiro-based compound represented by the following Formula 7.

[Formula 7]

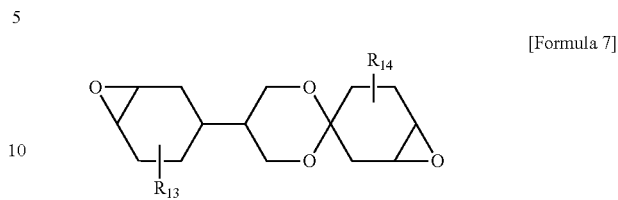

In Formula 7, $R_{13}$ and $R_{14}$ each independently represent hydrogen or an alkyl group.

Still other further examples of the alicyclic-type epoxy compound comprise a vinylcyclohexene diepoxide compound represented by the following Formula 8.

[Formula 8]

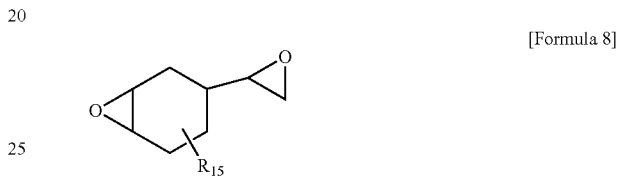

In Formula 8, $R_{15}$ represents hydrogen or an alkyl group. Yet other further examples of the alicyclic-type epoxy compound comprise an epoxycyclopentyl ether compound represented by the following Formula 9.

[Formula 9]

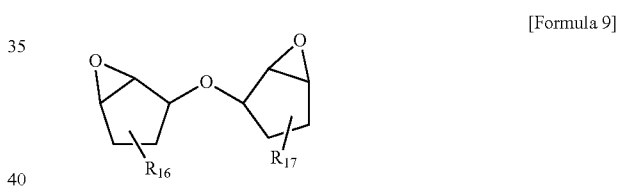

In Formula 9, $R_{16}$ and $R_{17}$ each independently represent hydrogen or an alkyl group.

Still yet other further examples of the alicyclic-type epoxy compound comprise a diepoxy tricyclo decane compound represented by the following Formula 10.

[Formula 10]

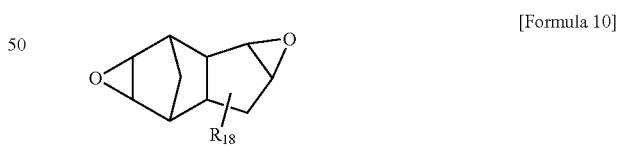

In Formula 10, Rig represents hydrogen or an alkyl group.

As the alicyclic-type epoxy compound, more specifically, it is preferred that an epoxycyclohexylmethyl epoxycyclohexanecarboxylate compound, an epoxycyclohexane carboxylate compound of an alkanediol, an epoxycyclohexylmethyl ester compound of a dicarboxylic acid or an epoxycyclohexylmethyl ether compound of an alkanediol is used, and it is possible to preferably use one or more selected from the group consisting of an esterification product of 7-oxabicyclo[4,1,0]heptane-3-carboxylic acid and (7-oxabicyclo[4,1,0]hepto-3-yl) methanol (a compound in which $R_1$ and $R_2$ are hydrogen in Formula 1); an esterification product of 4-methyl-7-oxabicyclo[4,1,0]heptane-3-carboxylic acid and (4-methyl-7-oxa-bicyclo[4,1,0]hepto-3-yl) methanol (a compound in which $R_1$ is 4-$CH_3$, and $R_2$ is 4-$CH_3$ in Formula 1); an esterification product of 7-oxabicyclo[4,1,0]heptane-3-carboxylic acid and 1,2-ethanediol (a compound in which $R_3$ and $R_4$ are hydrogen, and n is 1 in Formula 2); an esterification product of (7-oxabicyclo[4,1,0]hepto-3-yl) methanol and adipic acid (a compound in which $R_5$ and $R_6$ are hydrogen, and p is 2 in Formula 3); an esterification product of (4-methyl-7-oxabicyclo[4,1,0]hepto-3-yl) methanol and adipic acid (a compound in which $R_5$ and $R_6$ are 4-$CH_3$, and p is 2 in Formula 3); and an etherification product of (7-oxabicyclo[4,1,0]hepto-3-yl) methanol and 1,2-ethanediol (a compound in which $R_9$ and $R_{10}$ are hydrogen, and r is 1 in Formula 5), but the alicyclic epoxy compound is not limited thereto.

The aliphatic epoxy resin is analiphatic polyhydric alcohol or a polyglycidyl ether of an alkylene oxide adduct thereof. Examples thereof comprise diglycidyl ether of 1,4-butanediol, diglycidyl ether of 1,6-hexanediol, triglycidyl ether of glycerin, triglycidyl ether of trimethylolpropane, diglycidyl ether of polyethylene glycol, diglycidyl ether of propylene glycol, polyglycidyl ether of a polyether polyol obtained by adding one or more alkylene oxides (an ethylene oxide or a propylene oxide) to an aliphatic polyhydric alcohol such as ethylene glycol, propylene glycol, and glycerin, and the like.

The epoxy compound which does not contain an aromatic ring may be used either alone or in mixture of a plurality of epoxy compounds which do not contain an aromatic ring.

In an exemplary embodiment of the present specification, it is possible to use an epoxy compound which does not contain an aromatic ring, having a weight average molecular weight (Mw) of 1,000 to 5,000, preferably 2,000 to 4,000. In the present specification, a weight average molecular weight means a numerical value converted with respect to reference polystyrene measured by gel permeation chromatography (GPC), and unless otherwise specifically defined, the term "molecular weight" means "a weight average molecular weight". The durability of the protective layer may be appropriately maintained by adjusting the molecular weight to 1,000 or more, and the workability such as the coatability of the composition may also be effectively maintained by adjusting the molecular weight to 5,000 or less.

The oxetane compound is a compound having a four-membered cyclic ether in the molecule thereof, and examples thereof comprise 3-ethyl-3-hydroxymethyl-oxetane, 1,4-bis[(3-ethyl-3-oxetanyl)methoxymethyl]benzene, 3-ethyl-3-(phenoxymethyl)oxetane, di[(3-ethyl-3-oxetanyl) methyl]ether, 3-ethyl-3-(2-ethylhexyloxymethyl)oxetane, phenol novolac oxetane, and the like, but are not limited thereto. As these oxetane compounds, commercially available products can be easily purchased, and specific examples thereof comprise Aron Oxetane OXT-101 (manufactured by Toagosei Co., Ltd.), Aron Oxetane OXT-121 (manufactured by Toagosei Co., Ltd.), Aron Oxetane OXT-211 (manufactured by Toagosei Co., Ltd.), Aron Oxetane OXT-221 (manufactured by Toagosei Co., Ltd.), Aron Oxetane OXT-212 (manufactured by Toagosei Co., Ltd.), and the like.

In an exemplary embodiment of the present specification, the active energy ray curable composition may further comprise a curable component, and the curable component may be a compound having a (meth)acryloyl group and a compound having a plurality of polymerizable double bonds such as a vinyl group. Examples thereof comprise tripropylene glycol diacrylate, 1,9-nonane diol diacrylate, tricyclodecanedimethanol diacrylate, cyclic trimethylolpropane formal acrylate, dioxane glycol diacrylate, EO-modified diglycerin tetraacrylate, Aronix M-220 (manufactured by Toagosei Co., Ltd.), LIGHT ACRYLATE 1,9ND-A (manufactured by Kyoeisha Chemical Co., Ltd.), LIGHT ACRYLATE DGE-4A (manufactured by Kyoeisha Chemical Co., Ltd.), LIGHT ACRYLATE DCP-A (manufactured by Kyoeisha Chemical Co., Ltd.), SR-531 (manufactured by Sartomer Company, Inc.), CD-536 (manufactured by Sartomer Company, Inc.), and the like. In addition, examples thereof comprise various epoxy (meth)acrylates, urethane (meth) acrylates, polyester (meth)acrylates, or various (meth)acrylate-based monomers, and the like, if necessary. When the curable component is included, there are advantages in that the curing rate may be increased, and a high level of curing can be achieved even in a low light amount.

In an exemplary embodiment of the present specification, the curable component may be included in an amount of 10 to 50 parts by weight or 20 to 40 parts by weight based on 100 parts by weight of the epoxy compound (A).

In the present specification, the unit "parts by weight" means ratio of weights between respective components. By adjusting the ratio of the components of active energy ray curable composition as described above, it is possible to provide a protective layer which is excellent in curing efficiency of the composition and physical properties after curing the composition.

Polyol Compound

In an exemplary embodiment of the present specification, the active energy ray curable composition may further comprise a polyol compound. The polyol compound serves to impart flexibility to cured epoxy chains.

In an exemplary embodiment of the present specification, the active energy ray curable composition may further comprise a polyol compound in an amount of 1 to 20 parts by weight, 2 to 15 parts by weight, or 5 to 10 parts by weight based on 100 parts by weight of the epoxy compound which does not contain an aromatic ring. When the numerical range is satisfied, it is possible to effectively suppress the blocking phenomenon between the protective layer and the carrier film while high temperature durability of the protective layer is excellent. In contrast, when the content is out of the numerical range, storage modulus and high temperature durability of the protective layer may deteriorate.

The polyol compound means a material obtained by reacting an initiator such as a multifunctional alcohol or an aromatic amine, which has two or more hydroxyl groups (—OH) or amine groups (—$NH_2$) in the molecule thereof with propylene oxide (PO) or ethylene oxide (EO).

The polyol compound is classified into a polyether polyol and a polyester polyol, and the polyester polyol is classified into a polyester polyol synthesized by polycondensation of an acid with a hydroxyl compound and a polyester polyol synthesized by a ring-opening addition polymerization of a caprolactone monomer, and the like.

In an exemplary embodiment of the present specification, preferred examples of the polyol compound comprise a polyester polyol.

In an exemplary embodiment of the present specification, examples of the polyester polyol comprise a polycaprolactone polyol.

Photoinitiator

According to an exemplary embodiment of the present specification, the active energy ray curable composition may further comprise a photoinitiator.

Examples of the photoinitiator comprise: an α-hydroxyketone-based compound (for example, IRGACURE 184, IRGACURE 500, IRGACURE 2959, DAROCUR 1173; manufactured by Ciba Specialty Chemicals Inc.); a phenylglyoxylate-based compound (for example, IRGACURE 754, DAROCUR MBF; manufactured by Ciba Specialty Chemicals Inc.); a benzyldimethylketal-based compound (for example, IRGACURE 651; manufactured by Ciba Specialty Chemicals Inc.); an α-aminoketone-based compound (for example, IRGACURE369, IRGACURE907, IRGACURE1300; manufactured by Ciba Specialty Chemicals Inc.); a monoacyl phosphine-based compound (MAPO) (for example, DAROCUR TPO; manufactured by Ciba Specialty Chemicals Inc.); a bis acyl phosphine-based compound (BAPO) (for example, IRGACURE 819, IRGACURE 819DW; manufactured by Ciba Specialty Chemicals Inc.); a phosphine oxide-based compound (for example, IRGACURE 2100; manufactured by Ciba Specialty Chemicals Inc.); a metallocene-based compound (for example, IRGACURE 784; manufactured by Ciba Specialty Chemicals Inc.); an iodonium salt (for example, IRGACURE 250; Ciba Specialty Chemicals Inc.); a mixture of one or more thereof (for example, DAROCUR 4265, IRGACURE 2022, IRGACURE 1300, IRGACURE 2005, IRGACURE 2010, IRGACURE 2020; manufactured by Ciba Specialty Chemicals Inc.); and the like. In the present invention, one or two or more of the photoinitiators may be used, but the photoinitiator is not limited thereto.

According to an exemplary embodiment of the present specification, the photoinitiator may be included in an amount of 0.5 part by weight to 10 parts by weight, preferably 0.01 part by weight to 5 parts by weight based on 100 parts by weight of the active energy ray curable composition. When the photoinitiator is included in a content within the numerical range, ultraviolet rays reach the inside of the protective layer, the polymerization rate is excellent, and it is possible to prevent the molecular weight of a polymer to be produced from being decreased. For this reason, there is an advantage in that cohesive strength of a protective layer to be formed is excellent and bonding strength with respect to the polarizer is excellent.

According to an exemplary embodiment of the present specification, it is preferred that the active energy ray curable composition has a glass transition temperature of 90° C. or more after curing, and the glass transition temperature may be, for example, 100° C. to 150° C. or 100° C. to 130° C.

According to an exemplary embodiment of the present specification, it is preferred that the active energy ray curable composition has a viscosity of 50 cps to 200 cps at room temperature, and the viscosity may be, for example, 50 cps to 130 cps at room temperature. When the viscosity of the composition satisfies the numerical range, there is an advantage in that the protective layer may be thinly formed and the workability is excellent. The room temperature may mean a temperature range of 23° C. to 28° C., and may be specifically 23° C., 24° C., 25° C., 26° C., 27° C., or 28° C.

The viscosity is measured at room temperature (25° C.) by using a No. 18 spindle using a Brookfield viscometer (manufactured by Brookfield Industries, Inc.). In this case, the amount of the composition is appropriately 6.5 to 10 mL, and a stabilized numerical value is measured within 5 minutes in order to evade exposure to light for a long period of time.

According to an exemplary embodiment of the present specification, the active energy ray curable composition may additionally comprise one or more additives selected from the group consisting of a dye, a pigment, an epoxy compound, a UV stabilizer, an antioxidant, a toning agent, a reinforcing agent, a filler, an antifoaming agent, a surfactant, a photosensitizer, and a plasticizer, if necessary.

Meanwhile, a method of forming the protective layer is not particularly limited, and the protective layer may be formed by a method well-known in the art. For example, the method may be performed as a method of applying the active energy ray curable composition on one surface of a polarizer by a coating method well-known in the art, for example, spin coating, bar coating, roll coating, gravure coating, blade coating, and the like to form a protective layer, and then curing the composition by irradiating the composition with ultraviolet rays. For example, the method may be performed as a method of irradiating the composition with ultraviolet rays which are irradiated lights by using an ultraviolet irradiation device.

A wavelength of the ultraviolet rays may be 100 nm to 400 nm, preferably 320 nm to 400 nm.

The light amount of light irradiated may be 100 mJ/cm$^2$ to 1,000 mJ/cm$^2$, preferably 500 mJ/cm$^2$ to 1,000 mJ/cm$^2$.

The irradiation time of light irradiated may be 1 second to 10 minutes, preferably 2 seconds to 30 seconds. When the irradiation time range is satisfied, there is an advantage in that it is possible to minimize traveling wrinkles from being generated in the polarizer by preventing heat from being excessively transferred from a light source.

According to an exemplary embodiment of the present specification, the protective layer has a thickness of 4 μm to 11 μm, preferably 5 μm to 10 μm, and more preferably 6 μm to 8 μm. When the thickness of the protective layer is smaller than the range, there is a concern in that the strength or high temperature durability of the protective layer deteriorates, and when the thickness is higher than the range, the thickness is not suitable in terms of thinning a polarizing plate.
Protective Film The protective film is for supporting and protecting a polarizer, and it is possible to use protective films of various materials generally known in the art, for example, a polyethylene terephthalate (PET) film, a cycloolefin polymer (COP) film, an acrylic film, and the like. Among them, it is particularly preferred that polyethylene terephthalate is used in consideration of optical characteristics, durability, economic feasibility, and the like.

In an exemplary embodiment of the present specification, the protective film may have a storage modulus of 1,500 MPa or more, preferably 1,800 MPa or more, and more preferably 2,000 MPa or more at 80° C. to 100° C. When the numerical range is satisfied, an effect of protecting the polarizer of the protective film may be enhanced. Specifically, it is possible to prevent tearing of the polarizer due to stress generated by shrinkage of the polarizer under a high temperature environment.

Meanwhile, attachment of the polarizer and the protective film may be performed by a method of coating a bonding agent composition for a polarizing plate on a surface of the polarizer or the protective film using a roll coater, a gravure coater, a bar coater, a knife coater, a capillary coater, or the like, and then heat-laminating the polarizer and the protective film using a laminated roll, or a method of pressing the polarizer and the protective film at room temperature to laminate the polarizer and the protective film or a method of irradiating the polarizer and the protective film with UV rays after laminating the polarizer and the protective film, and the like. The bonding agent composition for a polarizing plate will be described below.

Bonding Agent Layer

According to an exemplary embodiment of the present specification, the bonding agent layer is a cured product of a polarizing plate bonding agent composition.

According to an exemplary embodiment of the present specification, a thermal expansion coefficient of the bonding agent layer at 80° C. is 130 ppm/K or less.

According to an exemplary embodiment of the present specification, when the thermal expansion coefficient is more than 130 ppm/K, there is a problem in that cracks occur on the polarizing plate under a heat resistant impact environment.

It is preferred that the bonding agent layer is formed of a photocurable bonding agent composition. As described above, when the bonding agent layer is a curable resin layer formed of a photocurable composition, there is an advantage in that the manufacturing method thereof is simple, and furthermore, adhesion with the protective film is excellent. Further, the durability of the polarizing plate may be further improved.

In this case, the photocurable bonding agent composition is not particularly limited as long as the thermal expansion coefficient satisfies the range, and may be, for example, a photocurable composition comprising an epoxy compound and an oxetane compound.

As the epoxy compound, it is possible to use at least one or more of an alicyclic-type epoxy compound and a glycidyl ether-type epoxy compound, and preferably, it is possible to use a mixture of an alicyclic-type epoxy compound and a glycidyl ether-type epoxy compound.

According to an exemplary embodiment of the present specification, the alicyclic-type epoxy compound may be included in an amount of 10 wt % to 50 wt %, preferably 20 wt % to 40 wt %, based on the total weight of the epoxy compound. When the numerical range is satisfied, there is an advantage in that the composition may be effectively cured at the time of photocuring the alicyclic-type epoxy compound.

According to an exemplary embodiment of the present specification, the glycidyl ether-type epoxy compound may be included in an amount of 10 wt % to 60 wt %, preferably 20 wt % to 40 wt %, based on the total weight of the epoxy compound.

The oxetane compounds as described above may be used either alone or in mixture thereof, and the content thereof is preferably 10 to 50 parts by weight, and more preferably 28 to 40 parts by weight, based on 100 parts by weight of the epoxy compound. When the oxetane compound is included at an amount more than the range, there is a problem in that the bonding strength is decreased, and when the oxetane compound is included at an amount less than the range, there is a problem in that the viscosity is increased.

According to an exemplary embodiment of the present specification, the photocurable bonding agent composition may additionally comprise one or more additives selected from the group consisting of a dye, a pigment, an epoxy resin, a UV stabilizer, an antioxidant, a toning agent, a reinforcing agent, a filler, an antifoaming agent, a surfactant, a photosensitizer, a photoinitiator, and a plasticizer, if necessary.

Polarizer

First, as the polarizer of the present invention, a polarizer well-known in the art, for example, a film composed of polyvinyl alcohol (PVA) comprising iodine or a dichroic dye may be used. The polarizer may be manufactured by dyeing iodine or a dichroic dye on a polyvinyl alcohol film, but the manufacturing method thereof is not particularly limited. In the present specification, the polarizer means a state in which a protective layer (or a protective film) is not included, and the polarizing plate means a state in which a polarizer and a protective layer (or a protective film) are included.

Meanwhile, the polarizer may have a thickness of 5 µm to 40 µm, more preferably 5 µm to 25 µm. When the thickness of the polarizer is smaller than the range, optical characteristics may deteriorate, and when the thickness of the polarizer is higher than the range, the amount of polarizer shrunk at low temperature (approximately −30° C.) is increased, so that there may be a problem with the heat resistance of the overall polarizing plate.

Meanwhile, when the polarizer is a polyvinyl alcohol-based film, the polyvinyl alcohol-based film may be used without particular limitation as long as the film comprises a polyvinyl alcohol resin or a derivative thereof. In this case, examples of the derivative of the polyvinyl alcohol resin comprise a polyvinyl formal resin, a polyvinyl acetal resin, and the like, but are not limited thereto. Alternatively, as the polyvinyl alcohol-based film, it is also possible to use a commercially available polyvinyl alcohol-based film generally used in the manufacture of a polarizer in the art, for example, P30, PE30 and PE60 manufactured by Kuraray Co., Ltd., M2000, M3000 and M6000 manufactured by Japan Synthetic Co., Ltd., and the like. Meanwhile, the polyvinyl alcohol-based film may have a degree of polymerization of 1,000 to 10,000, preferably 1,500 to 5,000, but is not limited thereto. This is because when the degree of polymerization satisfies the range, molecules may freely move and be flexibly mixed with iodine or a dichroic dye, and the like.

Carrier Film

The polarizing plate-carrier film laminate according to an exemplary embodiment of the present specification comprises a carrier film.

In an exemplary embodiment of the present specification, the carrier film is not particularly limited, as long as the carrier film is easily peeled off in a process of manufacturing a polarizing plate. Examples thereof comprise polyethylene terephthalate, a cycloolefin polymer, polycarbonate, or triacetyl cellulose, and preferred examples thereof comprise polyethylene terephthalate. Polyethylene terephthalate is inexpensive, and thus has an advantage in that process costs may be reduced.

In an exemplary embodiment of the present specification, the carrier film may have a thickness of 10 µm to 150 µm, preferably 15 µm to 100 µm. When the thickness of the carrier film satisfies the numerical range, there are advantages in that it is possible to prevent wrinkles from being generated by swelling and/or shrinkage of the carrier film due to heat generated at the time of irradiation with ultraviolet rays, and it is possible to solve a problem in that an uncured part is generated because ultraviolet rays reach the protective layer well at the time of curing the protective layer by ultraviolet rays.

In an exemplary embodiment of the present specification, a light transmittance of the carrier film may be 70% to 100%. The light transmittance may be calculated by using a detector to detect light rays absorbed and emitted after irradiating the carrier film with a light ray having a wavelength of 200 nm to 800 nm using a UV-vis spectrophotometer, and then converting the light rays into a ratio.

When the numerical range is satisfied, there is an advantage in that at the time of irradiating a polarizing plate-carrier film laminate with ultraviolet rays in order to cure a protective layer and a bonding agent layer of the polarizing plate-carrier film laminate, curing may be efficiently performed because the ultraviolet rays reach the protective layer and the bonding agent layer well.

Manufacturing Method

The present specification provides a method for manufacturing the above-described polarizing plate-carrier film laminate.

The method for manufacturing a polarizing plate-carrier film may be performed by a roll-to-roll process. Since the method may be performed as a continuous process by using a roll-to-roll process, the production yield is high and the production unit price is reduced, so that there is an economic advantage.

The manufacturing of the polarizing plate-carrier film laminate according to an exemplary embodiment of the present specification may comprise: supplying a carrier film to one surface of a polarizer; supplying a protective film to the other surface of the polarizer; forming a protective layer by supplying an active energy ray curable composition between the polarizer and the carrier film; forming a bonding agent layer by supplying a photocurable bonding agent composition between the polarizer and the protective film; pressurizing a laminate in which the carrier film, the protective layer, the polarizer, the bonding agent layer, and the protective film are sequentially laminated by disposing a pair of pressurization means on each surface of the carrier film and the protective film; and curing the protective layer and the bonding agent layer by irradiating the protective layer and the bonding agent layer with an active energy ray.

The manufacturing of the polarizing plate-carrier film laminate according to an exemplary embodiment of the present specification may further comprise preparing a carrier film.

The preparing of the carrier film may further comprise providing a primer layer each on one surface or both surfaces of a carrier film by applying and drying a water-dispersible primer composition onto the carrier film on one surface or both surfaces of the carrier film.

Figure 4:
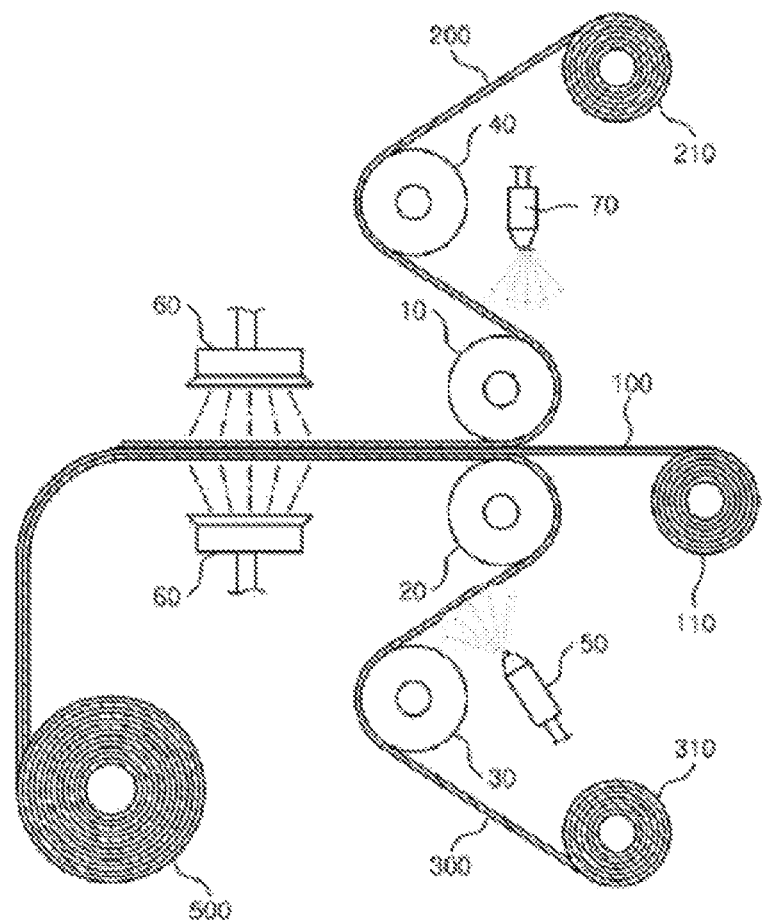
FIG. 4 illustrates an example of a method for manufacturing the polarizing plate-carrier film laminate according to an exemplary embodiment of the present specification.

In the method for manufacturing a polarizing plate according to an exemplary embodiment of the present specification as shown in FIG. 4, the film supplying process comprises: supplying a carrier film 200 on one surface of a polarizer 100; and supplying a protective film 300 on the other surface of the polarizer. Specifically, the method may be performed as a method of supplying the carrier film 200 on one surface of the polarizer 100, and simultaneously supplying the protective film 300 on the other surface of the polarizer 100.

The method of supplying the polarizer 100, the carrier film 200, and the protective film 300 may be performed by using a method well-known in the art. For example, the polarizer, the carrier film, and the protective film may be supplied in a form in which each film is wound around rolls (polarizer roll 110, carrier film roll 210, and protective film roll 310), but the supplying method is not limited thereto.

Further, when a carrier film is used as described above, it is possible to prevent other constitutions from being contaminated by a composition for forming a protective layer because the carrier film effectively protects a polarizer at the time of forming the protective layer, and the carrier film absorbs pressure applied by a pressurization means to alleviate stress acting on the polarizer, so that there is an effect of effectively suppressing breakage.

In an exemplary embodiment of the present specification, the rate of supplying each film is not particularly limited as long as the rate has a value appropriate for the manufacturing method, but for example, each film may be supplied at a rate of 1 M/min to 100 M/min, and may be preferably supplied at a rate of 10 M/min to 50 M/min, and in this case, there is an advantage in that the carrier film and the protective film may be stably bonded to the polarizer.

In an exemplary embodiment of the present specification, the polarizer may be stretched. That is, according to the method for manufacturing a polarizing plate-carrier film laminate of the present specification, the polarizer may be further subjected to a process of stretching a polarizer before the process of supplying a polarizer. In the process of stretching a polarizer, the conditions and the like are not particularly limited.

In an exemplary embodiment of the present specification, the polarizer may have a thickness of 5 μm to 25 μm. The thickness of the polarizer means a thickness after stretching. When the thickness after stretching satisfies the numerical range, a thin polarizing plate having a small thickness is easily manufactured.

As the polarizer, a polyvinyl alcohol-based resin film in which molecular chains containing an iodine-based compound or a dichroic dye are oriented in a predetermined direction may be used. The polarizer may be manufactured by a method of dyeing iodine or a dichroic dye on a polyvinyl alcohol-based resin film, and then stretching and crosslinking the polyvinyl alcohol-based resin film in a predetermined direction.

In an exemplary embodiment of the present specification, the stretching process may be performed as wet stretching performed in a solution such as an aqueous boric acid solution or an aqueous iodine solution, dry stretching performed under the atmosphere, or the like.

In an exemplary embodiment of the present specification, the concentration of the aqueous boric acid solution or the aqueous iodine solution is not particularly limited, but may be, for example, 1 to 10%.

In an exemplary embodiment of the present specification, the stretch ratio of the stretching process may be 4 times or more, more specifically 4 times to 15 times or 4 times to 13 times.

In an exemplary embodiment of the present specification, the stretching process may be performed in a machine direction (MD) of the polyvinyl alcohol-based resin film.

In an exemplary embodiment of the present specification, a width of the carrier film may be larger than that of the polarizer. When the width of the carrier film is made to be larger than that of the polarizer, it is possible to effectively reduce contamination of a pressurization means and the like by an active energy ray curable composition or a bonding agent composition.

The method for manufacturing a polarizing plate-carrier film laminate according to an exemplary embodiment of the present specification comprises forming a protective layer by supplying an active energy ray curable composition between the polarizer and the carrier film.

The forming of the protective layer may be performed by a method of applying an active energy ray curable composition onto at least one of the bonded surface of the polarizer and the bonded surface of the carrier film in any step during the film supplying process. The surface onto which the active energy ray curable composition is applied is not limited, and for example, the active energy ray curable composition may be applied to the bonded surface of the carrier film.

In this case, a surface activation treatment such as a corona treatment, a plasma treatment, an ultraviolet ray irradiation treatment, or an electron beam irradiation treatment may be performed on the bonded surface of the carrier film onto which the active energy ray curable composition is applied before the active energy ray curable composition is applied.

In an exemplary embodiment of the present specification, the method of applying the active energy ray curable composition is not particularly limited as long as the method may uniformly apply a required amount of composition. Examples thereof comprise a method such as spin coating, bar coating, roll coating, gravure coating, and blade coating, and the method may be preferably performed by roll coating for a continuous process. The application may be performed through an application means 70 of a composition for forming a protective layer.

The method for manufacturing a polarizing plate according to an exemplary embodiment of the present specification comprises forming a bonding agent layer by supplying a photocurable bonding agent composition between the polarizer and the protective film.

The forming of the bonding agent layer may be performed by a method of applying a photocurable bonding agent composition onto at least one of the bonded surface of the polarizer and the bonded surface of the protective film in any step during the film supplying process. The surface onto which the photocurable bonding agent composition is applied is not limited, and for example, the photocurable bonding agent may be applied to the bonded surface of the protective film.

In an exemplary embodiment of the present specification, the method of applying the photocurable bonding agent composition is not particularly limited as long as the method may uniformly apply a required amount of composition. Examples thereof comprise a method such as spin coating, bar coating, roll coating, gravure coating, and blade coating, and the method may be preferably performed by roll coating for a continuous process. The application may be performed through a bonding agent composition application means 50.

The method for manufacturing a polarizing plate-carrier film laminate according to an exemplary embodiment of the present specification comprises pressurizing a film laminate in which the carrier film, the polarizer, and the protective film are laminated by disposing a pair of pressurization means on each surface of the carrier film and the protective film. More specifically, the method may be performed by a pressurization method using a pair of pressurization means with the film laminate in which the carrier film, the polarizer, and the protective film are laminated therebetween. In this case, the pressurization means is not particularly limited, but for example, a bonding machine such as a laminator in a roll form or a pressurization roll 10 or 20 may be used.

In an exemplary embodiment of the present specification, the pressurizing of the laminate may be performed at a pressure of 0.5 MPa to 10 MPa or 1 MPa to 8 MPa. When the numerical range is satisfied, there are advantages in that it is possible to secure a stable traveling performance without damaging the polarizer and to effectively remove bubbles flowing in at the time of bonding the film.

The method for manufacturing a polarizing plate-carrier film laminate according to an exemplary embodiment of the present specification comprises curing the protective layer and the bonding agent layer by irradiating the protective layer and the bonding agent layer with an active energy ray.

In an exemplary embodiment of the present specification, the curing of the active energy ray curable composition and the photocurable bonding agent composition by irradiating the protective layer and the bonding agent layer with the active energy ray may be performed by a method for irradiating the active energy ray curable composition and the photocurable bonding agent composition with an irradiation light by using an active energy ray irradiation device. That is, the method may be performed through an active energy ray irradiation means 60.

The active energy ray irradiation means is not particularly limited, and examples thereof comprise a fusion lamp, an arc lamp, an LED, and a low-pressure lamp.

Since the method for manufacturing a polarizing plate-carrier film laminate according to an exemplary embodiment of the present specification irradiates a polarizer laminate on which a protective layer and a bonding agent layer are formed with an active energy ray, there is an advantage in that it is possible to simultaneously cure the protective layer and the bonding agent layer by irradiating the protective layer and the bonding agent layer with an active energy ray once.

The light amount of active energy ray may be 100 mJ/cm$^2$ to 1,000 mJ/cm$^2$, preferably 500 mJ/cm$^2$ to 1,000 mJ/cm$^2$, and the irradiation time of light irradiated may be 1 second to 10 minutes, preferably 2 seconds to 30 seconds.

When the light amount and irradiation time ranges of the active energy ray are satisfied, there is an advantage in that productivity is excellent because the curing rates of the bonding agent layer and the protective layer are high, and generation of travelling wrinkles on the polarizer is minimized by preventing heat from being excessively transferred from a light source without making appearance characteristics and optical characteristics of the film deteriorate.

Furthermore, the irradiation direction of the active energy ray is not particularly limited as long as the protective layer and the bonding agent layer may be sufficiently cured, but the irradiation of the protective layer and the bonding agent layer with the active energy ray may be preferably performed on the surface of the carrier film of the polarizing plate-carrier film laminate.

An exemplary embodiment of the present specification may comprise winding the manufactured polarizing plate-carrier film laminate. In this case, a polarizing plate winding roll 500 may be used.

The present specification provides a method for manufacturing a polarizing plate, the method comprising: peeling off a carrier film from the protective layer of the above-described polarizing plate-carrier film laminate.

In an exemplary embodiment of the present specification, the peeling off of the carrier film may be performed by a roll-to-roll process.

In an exemplary embodiment of the present specification, the method for manufacturing a polarizing plate comprises storing the polarizing plate-carrier film laminate before the peeling process.

In an exemplary embodiment of the present specification, the storing of the polarizing plate-carrier film laminate may be performed at room temperature (25° C.) and a relative humidity of 30% to 50% for 1 hour to 100 hours.

In an exemplary embodiment of the present specification, a rate in change B1 of the peel strength of the protective layer with respect to the carrier film according to the following Conversion Equation 1 may be 300% or less, preferably 250% or less, and more preferably 200% or less.

$$B1 = \frac{\sqrt{(X3' - X3)^2}}{X3} \times 100(\%) \quad \text{[Conversion Equation 1]}$$

In Conversion Equation 1, X3' is a bonding strength X3' of a protective layer with respect to a carrier film after the storing of the polarizing plate-carrier film laminate is performed, and X3 is a peel strength X3 of the protective layer with respect to the carrier film before the storing of the polarizing plate-carrier film laminate is performed.

In an exemplary embodiment of the present specification, a rate in change of the bonding strength of a protective layer with respect to a polarizer according to the following Conversion Equation 2 may be 0.05% or less.

$$B2 = \frac{\sqrt{(X1' - X1)^2}}{X1} \times 100 (\%) \qquad \text{[Conversion Equation 2]}$$

In Conversion Equation 2, X1' is a peel strength X1' of a protective layer with respect to a polarizer after the storing of the polarizing plate-carrier film laminate is performed, and X1 is a peel strength X1 of the protective layer with respect to the polarizer before the storing of the polarizing plate-carrier film laminate is performed.

According to an exemplary embodiment of the present specification, the peeling process may be performed by a roll-to-roll process. The roll-to-roll process means a process that is performed by a method of winding a peeled carrier film by peeling off the carrier film around a carrier film winding roll and simultaneously winding a polarizing plate in which the carrier film is peeled off around a winding roll.

Since a film supplying process, a pressurization process, and a peeling process may be simultaneously performed as a continuous process by using a roll-to-roll process in the method for manufacturing a polarizing plate according to an exemplary embodiment of the present specification as described above, there is an advantage in that the production yield is high and the method is very economical.

The method for manufacturing a polarizing plate according to an exemplary embodiment of the present specification may further comprise a process of forming an adhesive layer on a protective layer. The adhesive layer has a configuration provided to adhere a polarizing plate to a liquid crystal display device such as a liquid crystal panel.

The process of forming an adhesive layer is not particularly limited, and may be performed, for example, by a method of bonding a separate adhesive film onto a protective layer, or applying an adhesive agent composition onto a protective layer.

In an exemplary embodiment of the present specification, the method of applying the adhesive agent composition onto the protective layer is not particularly limited as long as the method may uniformly apply a required amount of composition. Examples thereof comprise a method such as spin coating, bar coating, roll coating, gravure coating, and blade coating, and the method may be preferably performed by roll coating for a continuous process.

In this case, a surface activation treatment such as a corona treatment, a plasma treatment, an ultraviolet ray irradiation treatment, or an electron beam irradiation treatment may be performed on the protective layer onto which the adhesive agent composition is applied before the adhesive agent composition is applied.

Active Energy Ray Curable Composition for Polarizing Plate Protective Layer

The present specification provides an active energy ray curable composition for a polarizing plate protective layer, comprising an epoxy compound which does not contain an aromatic ring and 15 to 40 parts by weight of a bisphenol F-type epoxy compound, 30 to 80 parts by weight of an oxetane compound, and 1 to 20 parts by weight of a polyol compound based on 100 parts by weight of the epoxy compound which does not contain an aromatic ring.

The descriptions on the epoxy compound which does not contain an aromatic ring, the bisphenol F-type epoxy compound, the oxetane compound, and the polyol compound is the same as those as described above.

Polarizing Plate

The present specification provides a polarizing plate manufactured by the above-described method for manufacturing a polarizing plate.

The polarizing plate has a structure in which a carrier film is peeled off from the above-described polarizing plate-carrier film laminate.

Specifically, the polarizing plate has a structure comprising: a polarizer 1; a bonding agent layer and a protective film 3 sequentially provided on one surface of the polarizer 1; and a protective layer 2 provided on the other surface of the polarizer (see FIG. 1).

Adhesive Layer

In an exemplary embodiment of the present specification, the polarizing plate may further comprise an adhesive layer on a surface opposite to a surface of a protective layer which is brought into contact with a polarizer.

Meanwhile, the polarizing plate of the present invention may comprise an adhesive layer on the upper portion of the protective layer, if necessary, in order to be attached to a display device panel or an optical film such as a phase difference film.

In this case, the adhesive layer may be formed by using various adhesive agents well-known in the art, and the type thereof is not particularly limited. For example, the adhesive layer may be formed by using a rubber-based adhesive agent, an acrylic adhesive agent, a silicone-based adhesive agent, a urethane-based adhesive agent, a polyvinyl alcohol-based adhesive agent, a polyvinyl pyrrolidone-based adhesive agent, a polyacrylamide-based adhesive agent, a cellulose-based adhesive agent, a vinylalkyl ether-based adhesive agent, and the like. Among them, it is particularly preferred to use an acrylic adhesive agent in consideration of transparency, heat resistance, and the like.

Meanwhile, the adhesive layer may also be formed by a method of applying an adhesive agent onto the upper portion of the protective layer, and may also be formed by a method of attaching an adhesion sheet, which is manufactured by applying an adhesive agent onto a release sheet, and then drying the adhesive agent, onto the upper portion of the protective layer.

Image Display Device

The polarizing plate of the present invention as described above may be usefully applied to an image display device such as a liquid crystal display device.

The image display device comprises: a liquid crystal panel; an upper polarizing plate provided on an upper surface of the liquid crystal panel; and a lower polarizing plate provided on a lower surface of the liquid crystal panel.

Figure 3:
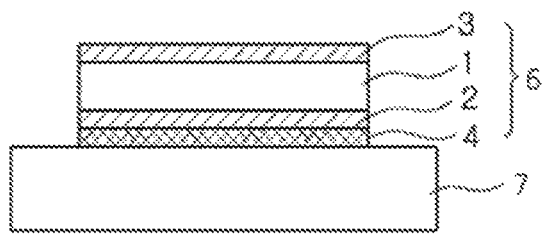
FIG. 3 is a cross-sectional view illustrating an aspect in which the polarizing plate according to an exemplary embodiment of the present specification is attached to an image display panel.

FIG. 3 illustrates that a polarizing plate 6 comprising: a polarizer 1; a bonding agent layer and a protective film 3 sequentially provided on one surface of the polarizer 1; and a protective layer 2 provided on the other surface of the polarizer is attached to an image display panel 7 through an adhesive layer 4.

The image display device according to an exemplary embodiment of the present specification comprises: a liquid crystal panel; an upper polarizing plate provided on an upper surface of the liquid crystal panel; and the polarizing plate according to the present specification as a lower polarizing plate provided on a lower surface of the liquid crystal panel.

The image display device according to an exemplary embodiment of the present specification comprises: a liquid crystal panel; the polarizing plate according to the present specification as an upper polarizing plate provided on an upper surface of the liquid crystal panel; and a lower polarizing plate provided on a lower surface of the liquid crystal panel.

The image display device according to an exemplary embodiment of the present specification comprises: a liquid crystal panel; an upper polarizing plate provided on an upper surface of the liquid crystal panel; and a lower polarizing plate provided on a lower surface of the liquid crystal panel, in which the upper polarizing plate and the lower polarizing plate are the polarizing plate according to the present specification.

In this case, the type of liquid crystal panel included in the liquid crystal display device is not particularly limited. For example, publicly-known panels, such as a passive matrix-type panel such as a twisted nematic (TN), super twisted nematic (STN), ferroelectric (F) or polymer dispersed (PD) panel; an active matrix-type panel such as a two terminal or three terminal panel; and an in-plane switching (IPS) panel and a vertical alignment (VA) panel, may be all applied without being limited in type. Furthermore, other configurations constituting the liquid crystal display device, for example, the type of upper or lower substrates (for example, a color filter substrate or an array substrate) or the like is not particularly limited, and a configuration publicly-known in the art may be adopted without limitation.

MODE FOR INVENTION

Hereinafter, the present specification will be described in more detail through Examples. However, the following Examples are provided for exemplifying the present specification, and the scope of the present specification is not limited thereby.

Experimental Examples

Preparation Examples (1) Preparation Example 1: Production of Photocurable Composition a for Forming Protective Layer A composition was produced by mixing 18 parts by weight of a bisphenol F-type epoxy compound (trade name YDF-170), 54 parts by weight of 3-ethyl-3-[(3-ethyloxetane-3-yl) methoxymethyl]oxetane (Aron Oxetane OXT-221 manufactured by Toagosei Co., Ltd.) which is an oxetane compound, and 9 parts by weight of a polycaprolactone triol (trade name PLACCEL 305) based on 100 parts by weight of 3,4-epoxycyclohexylmethyl-3',4-epoxycyclohexanecarboxylate which is an epoxy compound which does not contain an aromatic ring. An active energy ray curable composition A was produced by mixing 2 to 3 parts by weight of Irgacure 250 as a photoinitiator and 1 part by weight of ESACURE ITX as a photosensitizer based on 100 parts by weight of the composition. In this case, the active energy ray curable composition A had a viscosity of 100 cps at 25° C.

(2) Preparation Example 2: Production of Photocurable Composition B for Forming Protective Layer A composition was produced by mixing 30 parts by weight of a bisphenol F-type epoxy compound (trade name YDF-170), 60 parts by weight of 3-ethyl-3-[(3-ethyloxetane-3-yl) methoxymethyl]oxetane (Aron Oxetane OXT-221 manufactured by Toagosei Co., Ltd.) which is an oxetane compound, and 10 parts by weight of a polycaprolactone triol (trade name PLACCEL 305) based on 100 parts by weight of 3,4-epoxycyclohexylmethyl-3',4-epoxycyclohexanecarboxylate which is an epoxy compound which does not contain an aromatic ring. An active energy ray curable composition B was produced by mixing 2 to 3 parts by weight of Irgacure 250 as a photoinitiator and 1 part by weight of ESACURE ITX as a photosensitizer based on 100 parts by weight of the composition. In this case, the active energy ray curable composition B had a viscosity of 118 cps at 25° C.

(3) Preparation Example 3: Production of Photocurable Composition C for Forming Protective Layer A composition was produced by mixing 44 parts by weight of a bisphenol F-type epoxy compound (trade name YDF-170), 67 parts by weight of 3-ethyl-3-[(3-ethyloxetane-3-yl)methoxymethyl]oxetane (Aron Oxetane OXT-221 manufactured by Toagosei Co., Ltd.) which is an oxetane compound, and 11 parts by weight of a polycaprolactone triol (trade name PLACCEL 305) based on 100 parts by weight of 3,4-epoxycyclohexylmethyl-3',4-epoxycyclohexanecarboxylate which is an epoxy compound which does not contain an aromatic ring. An active energy ray curable composition C was produced by mixing 2 to 3 parts by weight of Irgacure 250 as a photoinitiator and 1 part by weight of ESACURE ITX as a photosensitizer based on 100 parts by weight of the composition. In this case, the active energy ray curable composition C had a viscosity of 130 cps at 25° C.

(4) Preparation Example 4: Production of Photocurable Composition D for Forming Protective Layer A composition was produced by mixing 62.5 parts by weight of a bisphenol F-type epoxy compound (trade name YDF-170), 75 parts by weight of 3-ethyl-3-[(3-ethyloxetane-3-yl) methoxymethyl]oxetane (Aron Oxetane OXT-221 manufactured by Toagosei Co., Ltd.) which is an oxetane compound, and 12.5 parts by weight of a polycaprolactone triol (trade name PLACCEL 305) based on 100 parts by weight of 3,4-epoxycyclohexylmethyl-3',4-epoxycyclohexanecarboxylate which is an epoxy compound which does not contain an aromatic ring. An active energy ray curable composition D was produced by mixing 2 to 3 parts by weight of Irgacure 250 as a photoinitiator and 1 part by weight of ESACURE ITX as a photosensitizer based on 100 parts by weight of the composition. In this case, the active energy ray curable composition D had a viscosity of 145 cps at 25° C.

(5) Preparation Example 5: Production of Photocurable Composition E for Forming Protective Layer A composition was produced by mixing 46 parts by weight of 3-ethyl-3-[(3-ethyloxetane-3-yl) methoxymethyl] oxetane (Aron Oxetane OXT-221 manufactured by Toagosei Co., Ltd.) which is an oxetane compound and 7.7 parts by weight of a polycaprolactone triol (trade name PLACCEL 305) based on 100 parts by weight of 3,4-epoxycyclohexylmethyl-3',4-epoxycyclohexanecarboxylate which is an epoxy compound which does not contain an aromatic ring. An active energy ray curable composition E was produced by mixing 2 to 3 parts by weight of Irgacure 250 as a photoinitiator and 1 part by weight of ESACURE ITX as a photosensitizer based on 100 parts by weight of the composition. In this case, the active energy ray curable composition E had a viscosity of 105 cps at 25° C.

(6) Preparation Example 6: Production of Photocurable Composition F for Forming Protective Layer A composition was produced by mixing 17 parts by weight of 1,4-cyclohexyl dimethanol diglycidyl ether (CHDMDGE) and 50 parts by weight of 3-ethyl-3-[(3-ethyloxetane-3-yl) methoxymethyl]oxetane (Aron Oxetane OXT-221 manufactured by Toagosei Co., Ltd.) which is an oxetane compound based on 100 parts by weight of 3,4-epoxycyclohexylmethyl-3',4-epoxycyclohexanecarboxylate which is an epoxy compound which does not contain an aromatic ring. An active energy ray curable composition F was produced by mixing 2 to 3 parts by weight of Irgacure 250 as a photoinitiator and 1 part by weight of ESACURE ITX as a photosensitizer based on 100 parts by weight of the composition. In this case, the active energy ray curable composition F had a viscosity of 92 cps at 25° C.

(7) Preparation Example 7: Production of Photocurable Composition G for Forming Protective Layer A composition was produced by mixing 40 parts by weight of 1,4-cyclohexyl dimethanol diglycidyl ether (CHDMDGE) and 60 parts by weight of 3-ethyl-3-[(3-ethyloxetane-3-yl) methoxymethyl]oxetane (Aron Oxetane OXT-221 manufactured by Toagosei Co., Ltd.) which is an oxetane compound based on 100 parts by weight of 3,4-epoxycyclohexylmethyl-3',4-epoxycyclohexanecarboxylate which is an epoxy compound which does not contain an aromatic ring. An active energy ray curable composition G was produced by mixing 2 to 3 parts by weight of Irgacure 250 as a photoinitiator and 1 part by weight of ESACURE ITX as a photosensitizer based on 100 parts by weight of the composition. In this case, the active energy ray curable composition G had a viscosity of 83 cps at 25° C.

(8) Preparation Example 8: Production of Photocurable Composition H for Forming Protective Layer A composition was produced by mixing 75 parts by weight of 1,4-cyclohexyl dimethanol diglycidyl ether (CHDMDGE) and 75 parts by weight of 3-ethyl-3-[(3-ethyloxetane-3-yl)methoxymethyl]oxetane (Aron Oxetane OXT-221 manufactured by Toagosei Co., Ltd.) which is an oxetane compound based on 100 parts by weight of 3,4-epoxycyclohexylmethyl-3',4-epoxycyclohexanecarboxylate which is an epoxy compound which does not contain an aromatic ring. An active energy ray curable composition G was produced by mixing 2 to 3 parts by weight of Irgacure 250 as a photoinitiator and 1 part by weight of ESACURE ITX as a photosensitizer based on 100 parts by weight of the composition. In this case, the active energy ray curable composition H had a viscosity of 68 cps at 25° C.

(9) Preparation Example 9: Production of Photocurable Composition I for Forming Protective Layer A composition was produced by mixing 43 parts by weight of 3-ethyl-3-[(3-ethyloxetane-3-yl)methoxymethyl] oxetane (Aron Oxetane OXT-221 manufactured by Toagosei Co., Ltd.) which is an oxetane compound based on 100 parts by weight of 3,4-epoxycyclohexylmethyl-3',4-epoxycyclohexanecarboxylate which is an epoxy compound which does not contain an aromatic ring. An active energy ray curable composition I was produced by mixing 2 to 3 parts by weight of Irgacure 250 as a photoinitiator and 1 part by weight of ESACURE ITX as a photosensitizer based on 100 parts by weight of the composition. In this case, the active energy ray curable composition I had a viscosity of 100 cps at 25° C.

(10) Preparation Example 10: Production of Photocurable Composition J for Forming Protective Layer A composition was produced by mixing 30 parts by weight of a bisphenol A-type epoxy compound (trade name: YDF-128 manufactured by Kukdo Chemical Co., Ltd.), 60 parts by weight of 3-ethyl-3-[(3-ethyloxetane-3-yl) methoxymethyl]oxetane (Aron Oxetane OXT-221 manufactured by Toagosei Co., Ltd.) which is an oxetane compound, and 10 parts by weight of a polycaprolactone triol (trade name PLACCEL 305) based on 100 parts by weight of 3,4-epoxycyclohexylmethyl-3',4-epoxycyclohexanecarboxylate which is an epoxy compound which does not contain an aromatic ring. An active energy ray curable composition J was produced by mixing 2 to 3 parts by weight of Irgacure 250 as a photoinitiator and 1 part by weight of ESACURE ITX as a photosensitizer based on 100 parts by weight of the composition. In this case, the active energy ray curable composition J had a viscosity of 300 cps or more at 25° C.

(11) Preparation Example B: Production of Photocurable Bonding Agent Composition A photocurable bonding agent composition was produced by adding 3 parts by weight of Irgacure 250 as a photoinitiator and 1 part by weight of ESACURE ITX as a photosensitizer to 100 parts by weight of a photocurable composition comprising 30 parts by weight of 3,4-epoxycyclohexylmethyl-3', 4'-epoxycyclohexanecarboxylate (trade name CEL-2021), 20 parts by weight of 3-ethyl-3-[(3-ethyloxetane-3-yl) methoxymethyl]oxetane (Aron Oxetane OXT-221 manufactured by Toagosei Co., Ltd.), 40 parts by weight of 1,4-cyclohexyl dimethanol diglycidyl ether (CHDMDGE), and 10 parts by weight of nonanediol diacrylate.

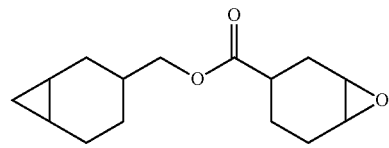

[CEL-2021P]

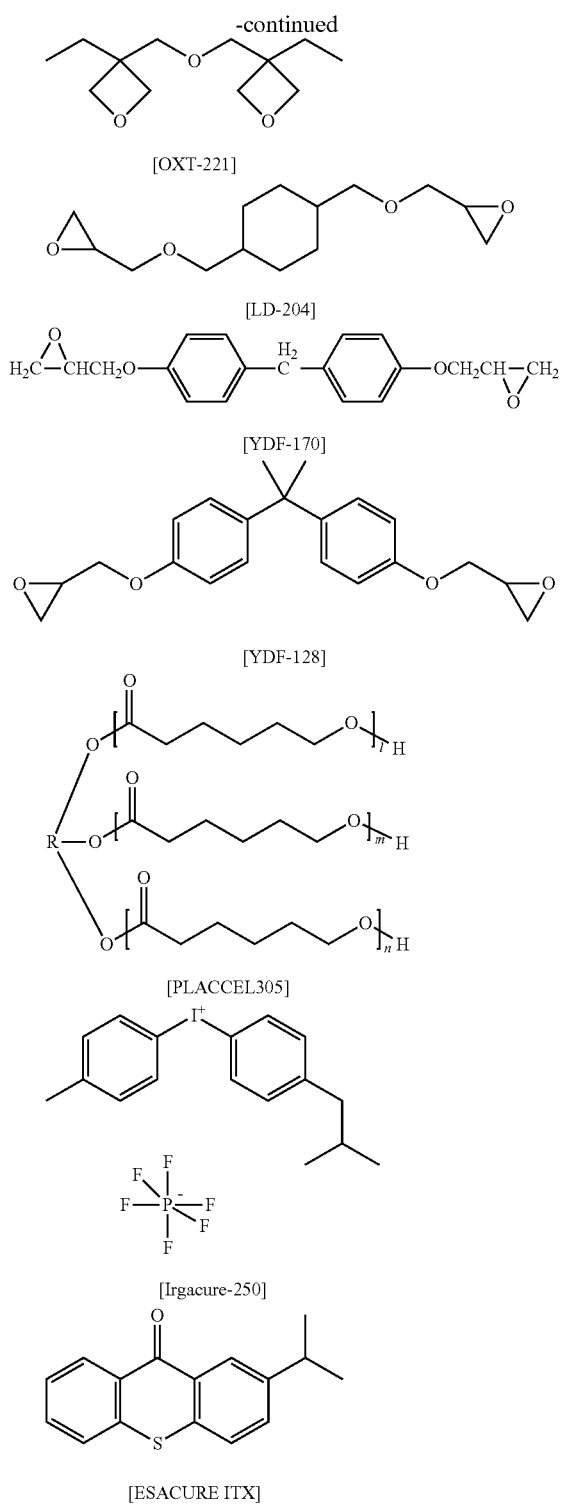

Example 1—Manufacture of Polarizing Plate

For a stretched polyvinyl alcohol-based film (manufacturer: Japan Synthetic Co., Ltd.) having a thickness of 23 μm prepared in advance, under an atmosphere of 25° C., a PET carrier film was supplied to the upper surface of the polyvinyl alcohol-based film and a polyethylene terephthalate film (PET, manufactured by Toyobo, Co., Ltd., Japan) as a protective film was supplied to the lower surface of the polyvinyl alcohol-based film, and the resulting film was allowed to pass through a pair of rolls at a rate of 10 M/min and a pressure of 2 MPa. In this case, a bonding agent layer was formed by applying the photocurable bonding agent composition produced in Preparation Example B to a thickness of about 3 μm between the polyvinyl alcohol-based film and the protective film using a roll-coating method. Further, a protective layer was formed by applying the photocurable composition A for forming a protective layer produced in Preparation Example 1 to a thickness of about 6 μm between the polyvinyl alcohol-based film and the carrier film using a roll-coating method.

Thereafter, the protective layer and the bonding agent layer were cured by irradiating the carrier film side with ultraviolet rays using a fusion lamp.

Thereafter, a film roll was formed by winding a laminate in which the protective film, the bonding agent layer, the polarizer, the protective layer, and the carrier film were sequentially laminated around a roll so as to have a sample length of 5 cm in a direction perpendicular to the winding direction.

Example 2

A polarizing plate was manufactured in the same manner as in Example 1, except that during the formation of the protective layer, the photocurable composition B for forming a protective layer was used instead of the photocurable composition A for forming a protective layer.

Comparative Example 1

A polarizing plate was manufactured in the same manner as in Example 1, except that during the formation of the protective layer, the photocurable composition C for forming a protective layer was used instead of the photocurable composition A for forming a protective layer.

Comparative Example 2

A polarizing plate was manufactured in the same manner as in Example 1, except that during the formation of the protective layer, the photocurable composition D for forming a protective layer was used instead of the photocurable composition A for forming a protective layer.

Comparative Example 3

A polarizing plate was manufactured in the same manner as in Example 1, except that during the formation of the protective layer, the photocurable composition E for forming a protective layer was used instead of the photocurable composition A for forming a protective layer.

Comparative Example 4

A polarizing plate was manufactured in the same manner as in Example 1, except that during the formation of the protective layer, the photocurable composition F for forming a protective layer was used instead of the photocurable composition A for forming a protective layer.

Comparative Example 5

A polarizing plate was manufactured in the same manner as in Example 1, except that during the formation of the protective layer, the photocurable composition G for forming a protective layer was used instead of the photocurable composition A for forming a protective layer.

Comparative Example 6

A polarizing plate was manufactured in the same manner as in Example 1, except that during the formation of the protective layer, the photocurable composition H for forming a protective layer was used instead of the photocurable composition A for forming a protective layer.

Comparative Example 7

A polarizing plate was manufactured in the same manner as in Example 1, except that during the formation of the protective layer, the photocurable composition I for forming a protective layer was used instead of the photocurable composition A for forming a protective layer.

Comparative Example 8

A polarizing plate was intended to be produced in the same manner as in Example 1, except that during the formation of the protective layer, the photocurable composition J for forming a protective layer was used instead of the photocurable composition A for forming a protective layer, but the viscosity of the photocurable composition J for forming a protective layer was so high that the composition was not properly coated, and as a result, the protective layer failed to be formed.

Experimental Example 1: Carrier Film Blocking Phenomenon Test 1—Peel Resistance Test After the polarizing plate-carrier film laminates manufactured in Examples 1 and 2 and Comparative Examples 1 to 8 were stored at room temperature (25° C.) and a relative humidity of 50% for 100 hours, a carrier film blocking phenomenon test was performed in order to confirm whether the carrier films were peeled off well. The peel resistance may be measured by using an ASTM 3330 measuring method using a film high-speed peeling machine (CBT-4720, Chungbuk Tech). The carrier PET film was peeled off at an angle of 180° with respect to the polarizing plate and a rate of 30 m/min. In order to measure the degree to which the protective layer and the carrier film adhered to each other in the process of peeling off the carrier film, the degree to which the carrier film was transferred to the protective layer after peeling off the carrier film was evaluated by the unaided eye.

In this case, the peeling was evaluated by classifying the appearance of the film into Lv. 0 to Lv. 3.

Lv. 0: A state in which at the time of peeling off the carrier film, the carrier film is peeled off cleanly without any abnormality in appearance of both the protective layer and the carrier film (PET area remaining on the surface of the protective layer is 0%)

Lv. 1: A state in which there is a resistance at the time of peeling the carrier film and the interface of the carrier film is peeled off with haze without any damage to the interface of the protective layer (PET area remaining on the surface of the protective layer is 0%)

Lv. 2: A state in which there is a resistance at the time of peeling the carrier film, the interface of the protective layer is damaged, and the interface of the carrier film is peeled off with haze (PET area remaining on the surface of the protective layer is 5% or more)

Lv. 3: A state in which the carrier film is torn off during peeling and complete peeling is impossible (PET area remaining on the surface of the protective layer is 80% or more)

Experimental Example 2: Carrier Film Blocking Phenomenon Test 2—Measurement of Haze After the carrier film peeling test was performed in the same manner as in Experimental Example 1, a rate of change in haze as compared to the initial haze value was measured by measuring an internal haze of the carrier film by a hazemeter (manufacturer: SECOS Co., Ltd.) in order to confirm whether the peeled carrier film was cleanly peeled off. The internal haze means the degree of cloudiness or turbidity and was measured as a haze in the transmission mode, and the degree thereof was expressed as a rate of change (%) in haze as compared to the initial haze value.

Experimental Example 3: Carrier Film Blocking Phenomenon Test 3—Peel Strength Test of Carrier Film The peel strength (X3) of the protective layer with respect to the carrier film was measured at 180° and a rate of 30 m/min in accordance with the ASTM D3330 by using a film high-speed peeling machine (CBT-4720, Chungbuk Tech).

Experimental Example 4: Carrier Film Blocking Phenomenon Test 4—Adhesion Strength Test of Protective Layer with Respect to Polarizer The adhesion strength of the protective layer with respect to the polarizer was measured by a cross-cut test method. Specifically, a cutting guide, an appropriate ruler, or the like is placed on a protective layer of each of the polarizing plates in Examples 1 and 2 and Comparative Examples 1 to 8, and grid shapes are drawn horizontally and vertically in the form of go board grids with an interval of 1 mm on the sample, by using a cross cutter. The surface of the protective layer is cleaned by a brush or a dust-free cloth, and then Nichiban tape (cellophane tape manufactured by Nichiban Co., Ltd.) is attached to the surface, and with respect to the peeled surface after the protective layer is sharply peeled off at a peel angle of 180 degrees, it is observed by the unaided eye how much the protective layer falls off. According to the above-described cross-cut classification standard (ASTM), the degree of bonding is divided into 0B to 5B.

Experimental Example 5: High Temperature Acceleration Evaluation of Polarizing Plate A polarizing plate was manufactured in the same manner as in the Examples and the Comparative Examples, except that before the polarizing plates manufactured in the Examples and the Comparative Examples were coated with the composition for forming a protective layer, cracks were generated by scratching the polarizing plates at a right angle with respect to the stretching direction of the polarizer under a load of 500 g using a pencil having a blunt tip.

Thereafter, the number of cracks through which light leaked among the total cracks (hereinafter, referred to as a crack ratio) was calculated by introducing the laminate into a chamber at a temperature of 80° C., the air atmosphere, and a humidity of 30% or less for 300 hours to 500 hours and observing whether cracks were widened by the shrinkage of the PVA on the crack site of the polarizer and light leaked from the cracks.

Experimental Result

TABLE 2

| Classification | Peel resistance test | Measurement of rate in change of haze | Carrier film peel strength test | Adhesion strength test of polarizer with respect to protective layer | High temperature acceleration evaluation |
| --- | --- | --- | --- | --- | --- |
| Example 1 | Lv. 0 | 0.18% | 15 gf/5 cm | 5B | 3% |
| Example 2 | Lv. 0 | 0.17% | 10 gf/5 cm | 5B | 3% |
| Comparative Example 1 | Lv. 0 | 0.15% | 10 gf/5 cm | 3B | 5% |
| Comparative Example 2 | Lv. 0 | 0.22% | 8 gf/5 cm | 3B | 5% |
| Comparative Example 3 | Lv. 1 | 1.49% | 110 gf/5 cm | 5B | 15% |
| Comparative Example 4 | Lv. 2 | 5.88% | 217 gf/5 cm | 5B | 10% |
| Comparative Example 5 | Lv. 0 | 0.12% | 15 gf/5 cm | 5B | 50% |
| Comparative Example 6 | Lv. 0 | 0.13% | 15 g/5 cm | 5B | 60% |
| Comparative Example 7 | Lv. 3 | Not measurable | Protective layer broken | 5B | 3% |
| Comparative Example 8 | The viscosity was so high that the evaluation was impossible | | | | |

From the experimental results, it could be confirmed that in Comparative Examples 3, 4, and 7, the resistance was high at the time of peeling off the carrier film, the peel strength during the peeling was too high (Comparative Examples 3 and 4) or breakage occurred. In this way, it could be confirmed that the rate in change of haze after peeling off the carrier film was too high. Further, it could be confirmed that in the case of Comparative Examples 1 and 2, the adhesion strength of the polarizer with respect to the protective layer was remarkably decreased, which is due to the fact that the weight of the bisphenol F epoxy compound included in the protective layer was too high. That is, by comparing Comparative Examples 1 and 2 with Examples 1 and 2, it could be confirmed that the adhesion strength of the polarizer with respect to the protective layer was excellent only when the weight of the bisphenol F epoxy compound included in the protective layer was adjusted within a predetermined range.

Meanwhile, in the case of Comparative Examples 3 to 6, the ratio of cracks generated during the high temperature acceleration evaluation was 10% or more, exhibiting a higher result than 3% which is a ratio of cracks generated in Comparative Examples 1 and 2.

The invention claimed is:

1. A method for manufacturing a polarizing plate-carrier film laminate, comprising:
    supplying a carrier film to a first surface of a polarizer;
    supplying a protective film to a second surface of the polarizer;
    forming a protective layer by supplying an active energy ray curable composition between the polarizer and the carrier film wherein the active energy ray curable composition comprises a bisphenol F epoxy compound, an oxetane compound, a polyol compound, and an epoxy compound which does not contain an aromatic ring, or a cured product thereof; and wherein the active energy ray curable composition includes 18 parts by weight of the bisphenol F epoxy compound, 30 to 80 parts by weight of the oxetane compound, and 1 to 20 parts by weight of the polyol compound based on 100 parts by weight of the epoxy compound which does not contain an aromatic ring, wherein the bisphenol F epoxy compound has a viscosity at 25° C. of 2,000 cps to 5,000 cps;
    forming a bonding agent layer by supplying a photocurable bonding agent composition between the polarizer and the protective film;
    pressurizing a laminate in which the carrier film, the protective layer, the polarizer, the bonding agent layer, and the protective film are sequentially laminated by disposing a pair of pressurization means on opposing surfaces of the laminate; and
    curing the protective layer and the bonding agent layer by irradiating the protective layer and the bonding agent layer with an active energy ray.

2. The method of claim 1, wherein the active energy ray curable composition has a viscosity of 50 cps to 200 cps at room temperature.

3. A polarizing plate comprising:
    a polarizer;
    a bonding agent layer and a protective film sequentially provided on one surface of the polarizer; and
    a protective layer which is directly attached to the other surface of the polarizer,
    wherein the protective layer is a resin layer comprising an active energy ray curable composition comprising a bisphenol F epoxy compound, an oxetane compound, a polyol compound, and an epoxy compound which does not contain an aromatic ring, or a cured product thereof; and
    wherein the active energy ray curable composition includes 18 parts by weight of the bisphenol F epoxy compound, 30 to 80 parts by weight of the oxetane compound, and 1 to 20 parts by weight of the polyol compound based on 100 parts by weight of the epoxy compound which does not contain an aromatic ring, wherein the bisphenol F epoxy compound has a viscosity at 25° C. of 2,000 cps to 5,000 cps.

4. The polarizing plate of claim 3, wherein a bonding strength (X1) of the protective layer with respect to the polarizer is 4B or more when measured by an ASTM standard cross-cut tape test in accordance with D3359-87.

5. The polarizing plate of claim 3, wherein an epoxy equivalent weight of the bisphenol F epoxy compound is 120 g/eq or more.

6. The polarizing plate of claim 3, wherein the bisphenol F epoxy compound has a viscosity of 2,000 cps to 3,500 cps at 25° C.

7. The polarizing plate of claim 3, wherein the protective layer has a thickness of 4 μm to 11 μm.

8. The polarizing plate of claim 3, wherein the active energy ray curable composition has a glass transition temperature of 90° C. or more after curing.

9. The polarizing plate of claim 3, wherein the polarizer is a polyvinyl alcohol-based film.

10. The polarizing plate of claim 3, wherein a bonding strength (X1) of the protective layer with respect to the polarizer is 4B to 5B when measured by an ASTM standard cross-cut tape test in accordance with D3359-87.

11. The polarizing plate of claim 3, wherein an epoxy equivalent weight of the bisphenol F epoxy compound is 120 g/eq to 500 g/eq.

12. The polarizing plate of claim 3, wherein the active energy ray curable composition has a glass transition temperature from 100° C. to 150° C. after curing.

13. A polarizing plate-carrier film laminate comprising:
the polarizing plate according to claim 3; and
a carrier film on a surface opposite to a surface of the protective layer of the polarizing plate which is in contact with the polarizer.

14. The polarizing plate-carrier film laminate of claim 13, wherein X2 calculated according to the following General Equation 1 is 0.95 to 1:

$$X2 = \text{(Area of the remaining protective layer after the ASTM standard cross-cut tape test)/(Area of the entire peeled surface)}. \quad \text{[General Equation 1]}$$

15. The polarizing plate-carrier film laminate of claim 13, wherein a peel strength (X3) of the protective layer with respect to the carrier film is 40 gf/5 cm or less.

16. A method for manufacturing a polarizing plate, comprising: peeling off the carrier film from the protective layer of the polarizing plate-carrier film laminate according to claim 13.

* * * * *